United States Patent
Umetani

(10) Patent No.: US 9,054,595 B2
(45) Date of Patent: Jun. 9, 2015

(54) AC-DC CONVERTER

(71) Applicant: DENSO CORPORATION, Kariya, Aichi-pref. (JP)

(72) Inventor: Kazuhiro Umetani, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/155,510

(22) Filed: Jan. 15, 2014

(65) Prior Publication Data

US 2014/0204635 A1    Jul. 24, 2014

(30) Foreign Application Priority Data

Jan. 21, 2013    (JP) .................................... 2013-8080

(51) Int. Cl.
   *H02M 1/34*    (2007.01)
   *H02M 1/42*    (2007.01)

(52) U.S. Cl.
   CPC .............. *H02M 1/34* (2013.01); *H02M 1/4225* (2013.01); *H02M 2001/342* (2013.01); *H02M 2001/346* (2013.01); *Y02B 70/126* (2013.01); *Y02B 70/1491* (2013.01)

(58) Field of Classification Search
   USPC .......................... 363/50, 52, 53, 123, 125, 127
   See application file for complete search history.

(56) References Cited

U.S. PATENT DOCUMENTS

| | | | |
|---|---|---|---|
| 4,791,545 A * | 12/1988 | Hinckley | 363/81 |
| 5,847,548 A * | 12/1998 | He et al. | 323/222 |
| 6,058,037 A | 5/2000 | Shibata et al. | |
| 7,358,700 B2 * | 4/2008 | Qian et al. | 318/809 |
| 7,675,760 B2 * | 3/2010 | Makino et al. | 363/21.08 |
| 7,791,904 B2 * | 9/2010 | Zhang et al. | 363/17 |
| 8,686,706 B2 * | 4/2014 | Cheng | 323/311 |
| 2002/0136033 A1 | 9/2002 | Hirokawa et al. | |
| 2005/0212501 A1 * | 9/2005 | Acatrinei | 323/283 |
| 2008/0253158 A1 | 10/2008 | Mochikawa et al. | |
| 2011/0096577 A1 | 4/2011 | Yamada | |
| 2012/0069604 A1 | 3/2012 | Yagyu et al. | |
| 2012/0099348 A1 | 4/2012 | Umetani | |

(Continued)

FOREIGN PATENT DOCUMENTS

| | | | |
|---|---|---|---|
| JP | 2000-116137 A | 4/2000 | |
| JP | 2001-008445 A | 1/2001 | |
| JP | 2004-336935 A | 11/2004 | |
| JP | 2005-224080 A | 8/2005 | |
| JP | 2006-353047 A | 12/2006 | |

(Continued)

OTHER PUBLICATIONS

Office Action mailed Mar. 3, 2015 issued in corresponding JP patent application No. 2013-008080 (and English translation).

*Primary Examiner* — Adolf Berhane
(74) *Attorney, Agent, or Firm* — Posz Law Group, PLC

(57) ABSTRACT

An AC-DC converter includes two series circuits, an inductor, and a common snubber circuit. Each series circuit includes a switch and a current block device. The block device blocks a current from its high potential side to its low potential side when the first device is closed and allows the current from the low potential side to the high potential side when the first device is opened. The inductor is interposed between a first connection point between the switch and the block device of one series circuit and a second connection point between the switch and the block device of the other series circuit. The common snubber circuit is connected between each of the first connection point and the second connection point and at least one of both ends of the one series circuit.

15 Claims, 24 Drawing Sheets

(56) References Cited

U.S. PATENT DOCUMENTS

2013/0308346 A1* 11/2013 Divan et al. ............ 363/21.01
2014/0254223 A1* 9/2014 Limpaecher ............ 363/126

FOREIGN PATENT DOCUMENTS

| JP | 2011-152017 A | 8/2011 |
| JP | 2011-211849 A | 10/2011 |

* cited by examiner

S2

S4

S1

S3

S1

S2

S3

S4

FIG. 5A S1
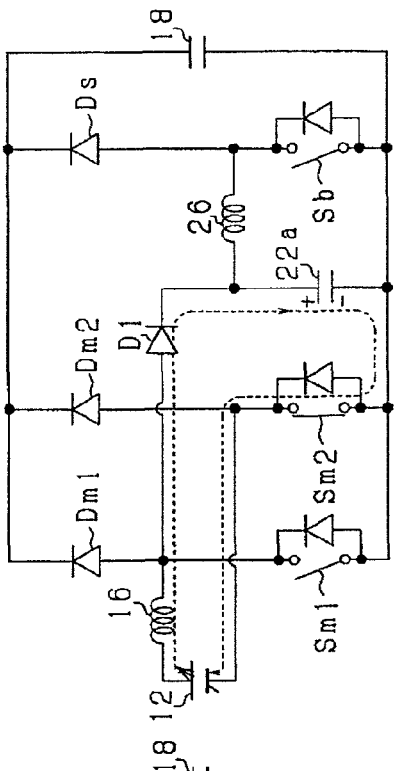
FIG. 5B S2
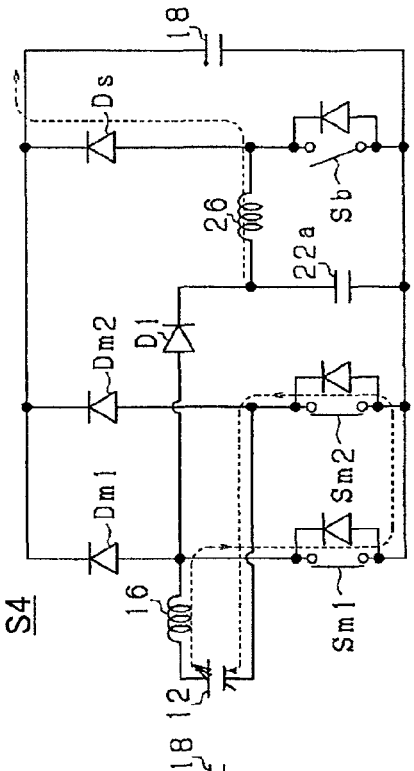
FIG. 5C S3
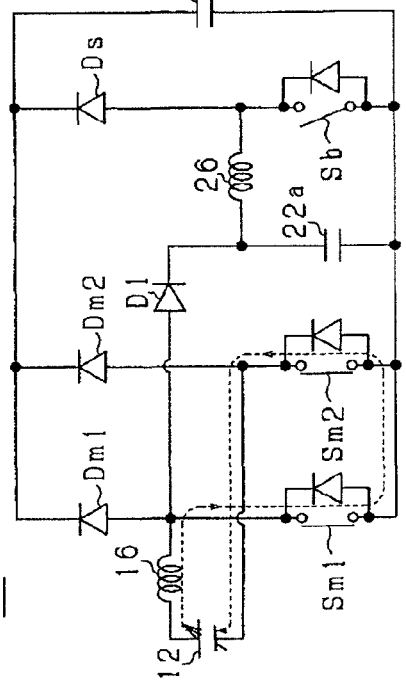
FIG. 5D S4
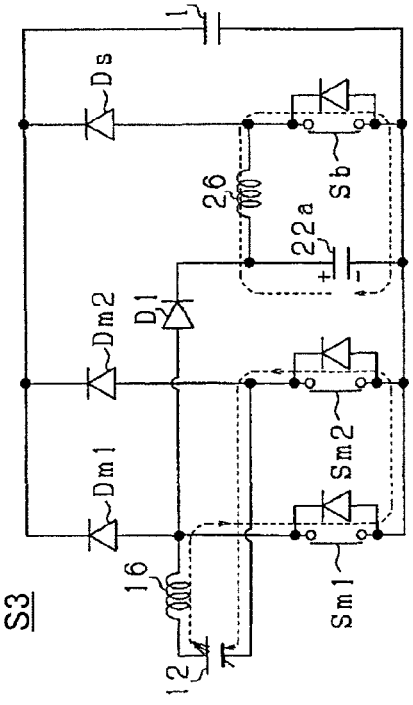

S1

S2

S3

S4

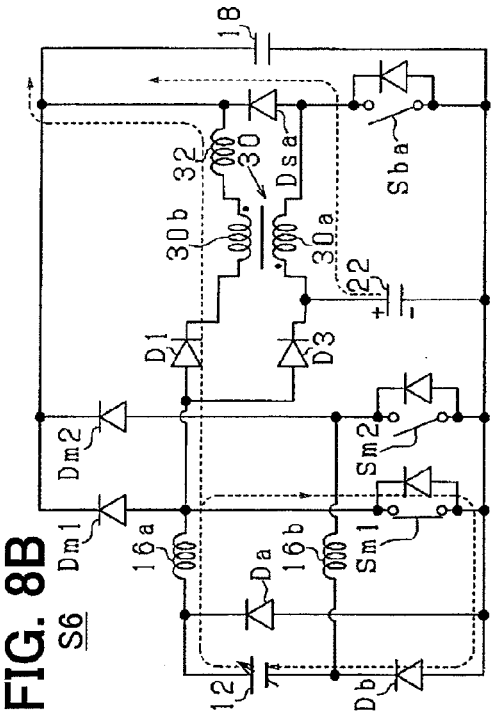
FIG. 8A S5
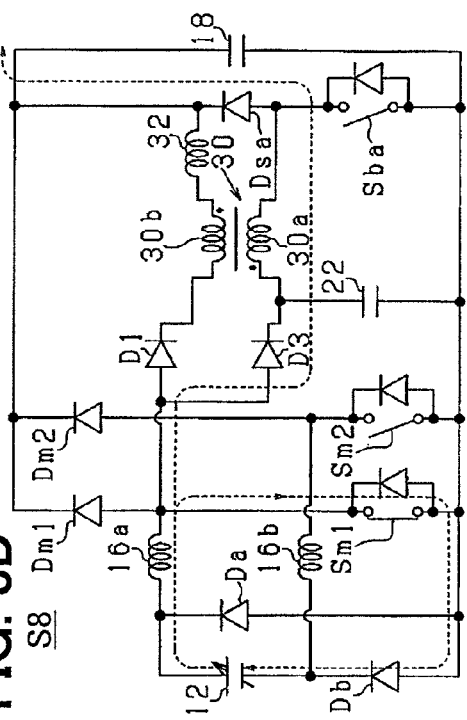
FIG. 8B S6
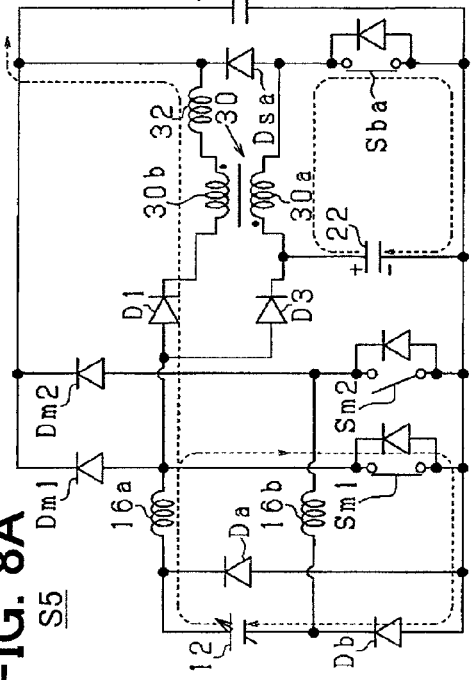
FIG. 8C S7
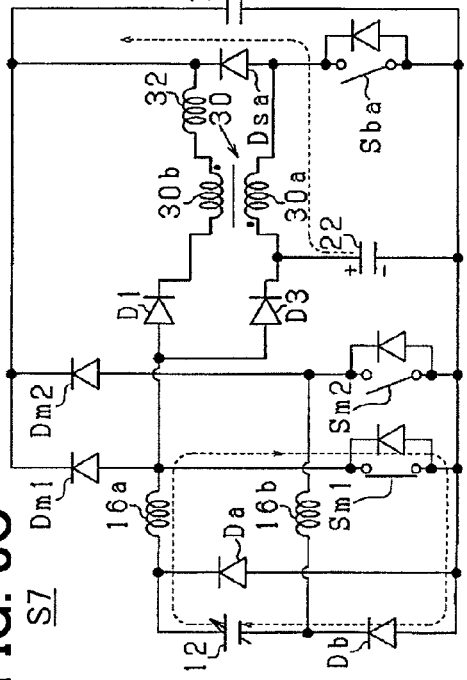
FIG. 8D S8

S1

S2

S3

S4

S5

S6

S7

S8

S1

S2

S3

S4

S1

S3

S2

S4

S1

S2

S3

S4

S6

S8

S5

S7

S1

S3

S1

S2

S3

S4

S5

S6

S7

S8

AC-DC CONVERTER

CROSS REFERENCE TO RELATED APPLICATION

This application is based on Japanese Patent Application No. 2013-008080 filed on Jan. 21, 2013, the contents of which are incorporated herein by reference.

TECHNICAL FIELD

The present disclosure relates to an AC-DC converter including a first device capable of opening and closing a current path, a second device connected in series to the first device, a third device capable of opening and closing a current path, a fourth device connected in series to the third device, and an inductor interposed between a first connection point between the first device and the second device and a second connection point between the third device and the fourth device.

BACKGROUND

JP-2011-152017A discloses a bridgeless power factor correction (PFC) circuit including two series circuits, each of which has a diode and a semiconductor switching device (an N-channel MOSFET). A connection point between the diode and the switching device of one series circuit is connected to a connection point between the diode and the switching device of the other series circuit through an inductor and an AC power source. This configuration reduces loss in conversion from an AC voltage to a DC voltage.

In the above circuit, the switching device switches between an ON state and an OFF state at a high speed. Therefore, when the switching device switches from one of the ON state and the OFF state to the other of the ON state and the OFF state, a surge voltage occurs. Specifically, when the switching device switches from the ON state to the OFF state, a surge voltage occurs, and when the switching device switches from the OFF state to the ON state, a surge voltage due to a recovery of the diode occurs. As a result, loss in an AC-DC converter may be increased, reliability of the switching device and the diode may be is degraded, and high-frequency noise may be produced.

SUMMARY

Such disadvantages can be solved by connecting a snubber circuit to each of the switching device and the diode. However, in this case, there is a need to add the same number of snubber circuits as the number of the switching devices or the diodes to the AC-DC converter. Therefore, the number of components of the AC-DC converter is increased, so that the cost of the AC-DC converter will be increased.

In view of the above, it is an object of the present disclosure to provide an AC-DC converter for reducing an increase in cost due to addition of a snubber circuit.

According to an aspect of the present disclosure, an AC-DC converter includes a first device, a second device, a third device, a fourth device, a main inductor, a common snubber circuit, a fifth device, and a sixth device. The first device is capable of switching between an open state to open a current path and a closed state to close the current path. The second device is connected in series to the first device to form a first series circuit with a first end defined by the first device and a second end defined by the second device. The third device is capable of switching between an open state to open the current path and a closed state to close the current path. The fourth device is connected in series to the third device to form a second series circuit with a first end defined by the third device and a second end defined by the fourth device. The main inductor is interposed between a first connection point between the first device and the second device and a second connection point between the third device and the fourth device. The common snubber circuit is connected between each of the first connection point and the second connection point and at least one of the first end and the second end of the first series circuit. The fifth device is connected between the first connection point and the snubber circuit. The sixth device is connected between the second connection point and the snubber circuit. The first end of the first series circuit is connected to the first end of the second series circuit. The second end of the first series circuit is connected to the second end of the second series circuit. The second device blocks a current from a high potential side to a low potential side of the second device when the first device is in the closed state and allows the current from the low potential side to the high potential side of the second device when the first device is in the open state. The fourth device blocks the current from a high potential side to a low potential side of the fourth device when the third device is in the closed state and allows the current from the low potential side to the high potential side of the fourth device when the third device is in the open state. When the first device switches from the closed state to the open state to block the current through the first device, the current flows between the main inductor and the first connection point in a first direction. The fifth device blocks the current between the main inductor and the first connection point in a second direction opposite to the first direction from flowing through the fifth device. When the third device switches from the closed state to the open state to block the current through the third device, the current flows between the main inductor and the second connection point in a third direction. The sixth device blocks the current between the main inductor and the second connection point in a fourth direction opposite to the third direction from flowing through the sixth device.

An advantage of the above aspect is that the snubber circuit is shared between the first device and the third device and also between the second device and the fourth device. Thus, an increase in the number of components of the AC-DC converter due to addition of the snubber circuit is reduced. Accordingly, an increase in cost of the AC-DC converter is reduced.

BRIEF DESCRIPTION OF THE DRAWINGS

The above and other objects, features and advantages of the present disclosure will become more apparent from the following detailed description made with reference to the accompanying drawings, in which the same reference characters represent the same elements. In the drawings:

FIGS. 5A, 5B, 5C, and 5D are diagrams illustrating a current flow in a converter according to the second embodiment;

FIGS. 8A, 8B, 8C, and 8D are diagrams illustrating a current flow in a converter according to the third embodiment;

DETAILED DESCRIPTION

First Embodiment

A first embodiment of the present disclosure is described below with reference to the drawings.

Figure 1:
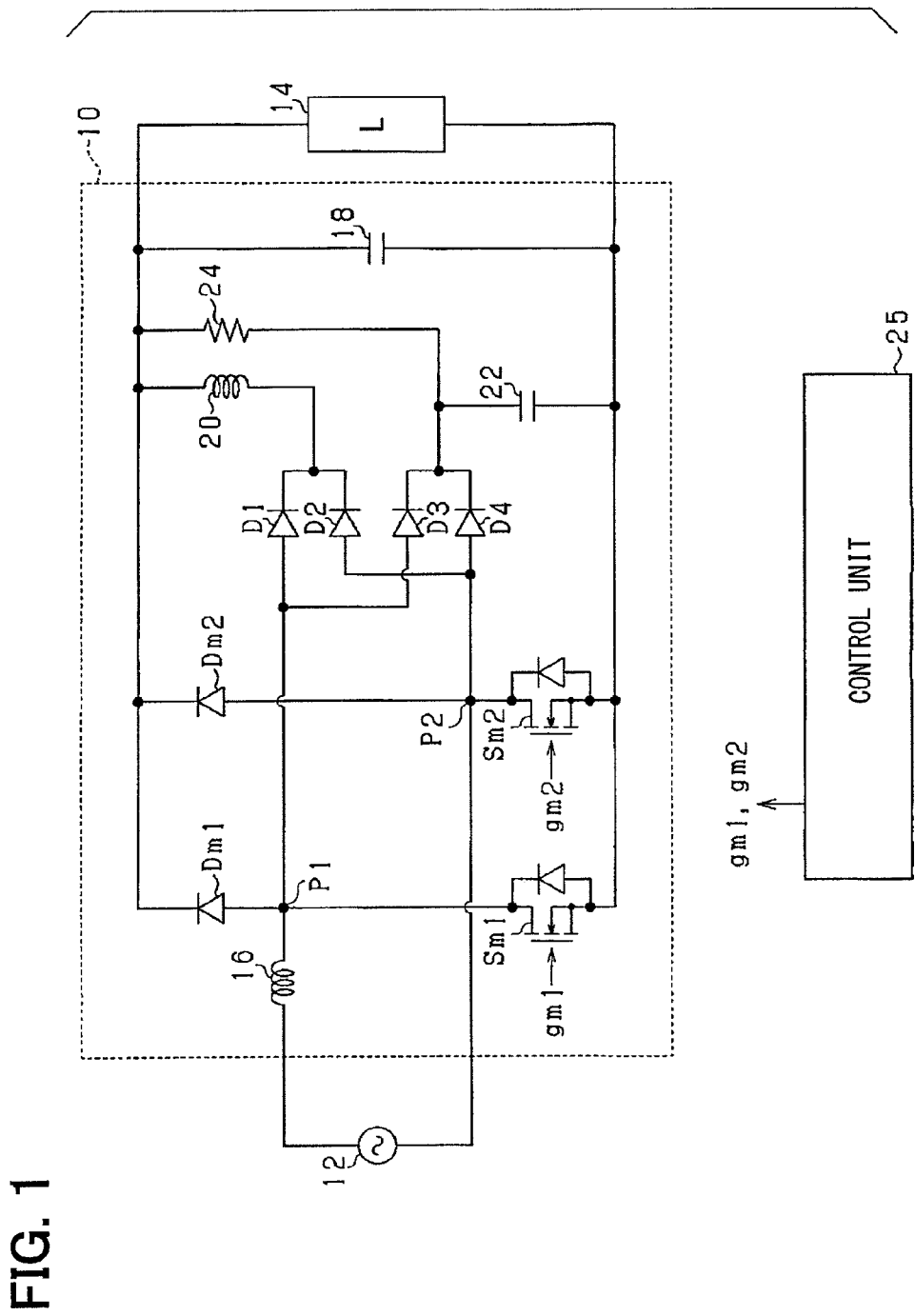
FIG. 1 is a diagram illustrating a system according to a first embodiment of the present disclosure.

As shown in FIG. 1, a converter 10 converts an AC voltage, which is supplied from an AC power source (a commercial power source), to a DC voltage and applies the DC voltage to a load 14. According to the first embodiment, the converter 10 is configured as a bridgeless PFC circuit. The converter 10 has a main section and an auxiliary section for reducing switching loss. The main section of the converter 10 includes a first main switch Sm1, a first main diode Dm1, a second main switch Sm2, a second main diode Dm2, a main inductor 16, and a smoothing capacitor 18. The first main switch Sm1 and the first main diode Dm1 are connected in series to form a first series circuit. The second main switch Sm2 and the second main diode Dm2 are connected in series to form a second series circuit. The first series circuit and the second series circuit are connected in parallel to form a parallel circuit.

According to the first embodiment, each of the first main switch Sm1 and the second main switch Sm2 is an N-channel MOSFET. The first main switch Sm1 corresponds to a first device recited in claims, the first main diode Dm1 corresponds to a second device recited in claims, the second main switch Sm2 corresponds to a third device recited in claims, and the second main diode Dm2 corresponds to a fourth device recited in claims.

The main section of the converter 10 is described below in detail. An anode of the first main diode Dm1 is connected to a drain of the first main switch Sm1 An anode of the second main diode Dm2 is connected to a drain of the second main switch Sm2. Cathodes of the first main diode Dm1 and the second main diode Dm2 are connected together, and sources of the first main switch Sm1 and the second main switch Sm2 are connected together.

A first connection point P1 between the first main diode Dm1 and the first main switch Sm1 is connected to a second connection point P2 between the second main diode Dm2 and the second main switch Sm2 through the main inductor 16 and the AC power source 12. Each of the smoothing capacitor 18 and the load 14 is connected in parallel to the parallel circuit of the first series circuit and the second series circuit.

Next, the auxiliary section of the converter 10 is described.

The auxiliary section of the converter 10 includes a first diode D1, a second diode D2, a third diode D3, a fourth diode D4, and a snubber circuit. The snubber circuit includes a snubber inductor 20, a snubber capacitor 22, and a resistor 24. A series circuit of the first diode D1 and the snubber inductor 20 is connected in parallel to the first main diode Dm1. A series circuit of the second diode D2 and the snubber inductor 20 is connected in parallel to the second main diode Dm2. It is noted that cathodes of the first diode D1 and the second diode D2 are connected to the snubber inductor 20. Each of the first diode D1 and the third diode D3 corresponds to a fifth device recited in claims, and each of the second diode D2 and the fourth diode D4 corresponds to a sixth device recited in claims.

A series circuit of the third diode D3 and the snubber capacitor 22 is connected to the first main switch Sm1. A series circuit of the fourth diode D4 and the snubber capacitor 22 is connected to the second main switch Sm2. It is noted that cathodes of the third diode D3 and the fourth diode D4 are connected to an end of the snubber capacitor 22. The end of the snubber capacitor 22 is connected to the cathode of the second main diode Dm2 through the resistor 24.

A control unit 25 controls an output voltage of the converter 10. The control unit 25 outputs control signals gm1 and gm2 to gates of the first main switch Sm1 and the second main switch Sm2, thereby controlling (i.e., turning ON and OFF) the first main switch Sm1 and the second main switch Sm2, respectively. Thus, the control unit 25 turns ON and OFF the first main switch Sm1 and the second main switch Sm2 so that AC power supplied to the main inductor 16 can be converted to DC power.

Next, operations of the auxiliary section of the converter 10 are described with reference to FIGS. 2A-2D and FIGS. 3A-3D.

FIGS. 2A-2D show a current flow in the converter 10 observed when an output voltage of the AC power source 12 has positive polarity. FIGS. 3A-3D show a current flow in the converter 10 observed when the output voltage of the AC power source 12 has negative polarity. The following description is basically based on a current continuous mode.

When the output voltage of the AC power source 12 has positive polarity, the first main switch Sm1 is controlled (i.e., turned ON and OFF) under a condition that the second main switch Sm2 is kept ON (i.e., kept closed). In this state, since a current always flows through the second main switch Sm2, the second connection point P2 becomes ground potential so that a reverse voltage can be applied across both of the second diode D2 and the fourth diode D4. Therefore, when the output voltage of the AC power source 12 has positive polarity, the converter 10 has four states as shown in FIGS. 2A-2D.

Figure 2B:
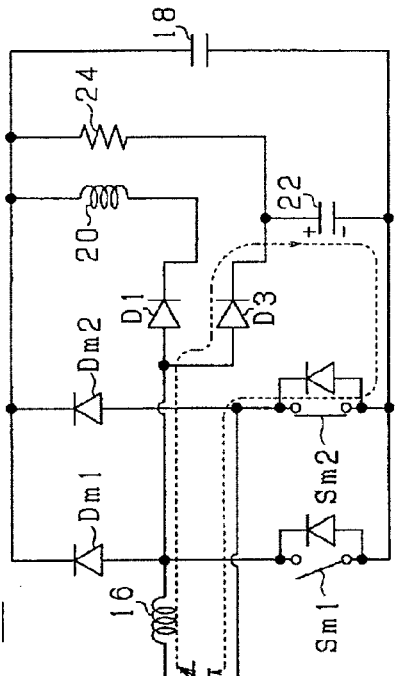
FIGS. 2A, 2B, 2C, and 2D are diagrams illustrating a current flow in a converter according to the first embodiment.
Figure 2D:
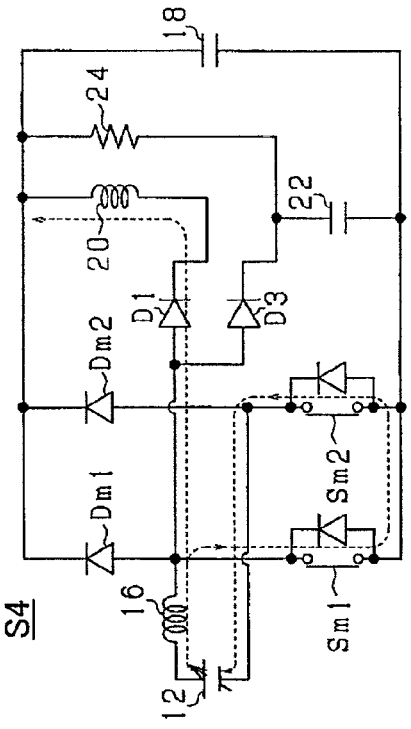
Figure 2A:
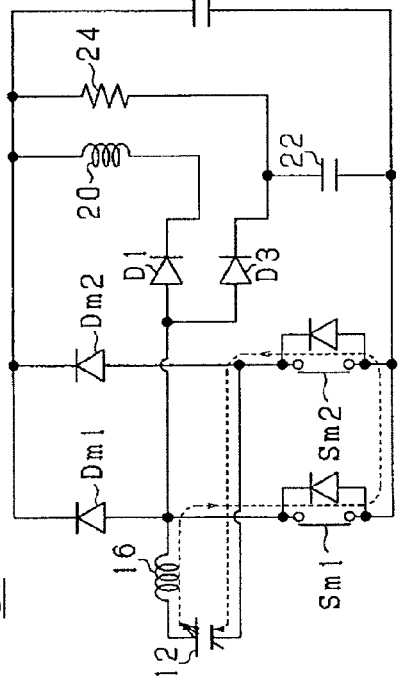

FIG. 2A shows a first state S1 where the first main switch Sm1 is ON under the condition that the second main switch Sm2 is kept ON. In the first state S1, the current flows through a closed loop circuit constructed with the AC power source 12, the main inductor 16, the first main switch Sm1, and the second main switch Sm2. Thus, magnetic energy is stored in the main inductor 16.

FIG. 2B shows a second state S2 subsequent to the first state S1 shown in FIG. 2A. When the first main switch Sm1 is turned OFF, there occurs a transition from the first state S1 to the second state S2. In the second state S2, the current flows through a closed loop circuit constructed with the AC power source 12, the main inductor 16, the third diode D3, the snubber capacitor 22, and the second main switch Sm2. In this case, when the first main switch Sm1 is turned OFF, a voltage between a pair of terminals (i.e., the drain and source) of the first main switch Sm1 is limited by a speed at which a voltage of the snubber capacitor 22 increases (i.e., at which the snubber capacitor 22 is charged). Therefore, a surge voltage occurring when the first main switch Sm1 is turned OFF can be reduced.

Figure 2C:
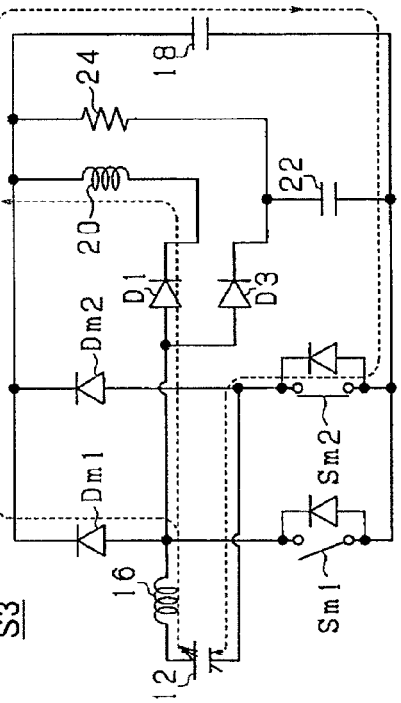

FIG. 2C shows a third state S3 subsequent to the second state S2 shown in FIG. 2B. When the voltage of the snubber capacitor 22 reaches the output voltage of the converter 10 (i.e., voltage of the smoothing capacitor 18) so that the current outputted from the main inductor 16 can flow through each of the first main diode Dm1 and the snubber inductor 20, there occurs a transition from the second state S2 to the third state S3.

FIG. 2D shows a fourth state S4 subsequent to the third state S3 shown in FIG. 2C. When the first main switch Sm1 is turned ON, there occurs a transition from the third state S3 to the fourth state S4. According to the first embodiment, even when the first main switch Sm1 is turned ON, the current flow from the main inductor 16 to the snubber inductor 20 through the first diode D1 is continued by the action of the snubber inductor 20. Further, when a recovery current flows due to application of a reverse voltage to the first main diode Dm1, an inductance of a current path where the recovery current flows is increased by the action of the snubber inductor 20. Therefore, the rate of change in the recovery current is reduced. Accordingly, a surge voltage due to the recovery current is reduced.

It is noted that one cycle of the operation of the auxiliary section is defined as one cycle of an ON and OFF operation of the first main switch Sm1 In the third state S3 shown in FIG. 2C and the fourth state S4 shown in FIG. 2D, the snubber capacitor 22 is discharged through the resistor 24, because the voltage of the snubber capacitor 22 increases above the voltage of the smoothing capacitor 18. When the current flowing through the snubber inductor 20 becomes zero in the fourth state S4, there occurs a transition from the fourth state S4 to the first state S1 shown in FIG. 2A.

In contrast, when the output voltage of the AC power source 12 has negative polarity, the second main switch Sm2 is turned ON and OFF under a condition that the first main switch Sm1 is kept ON (i.e., kept closed). In this state, since the current always flows through the first main switch Sm1, the first connection point P1 becomes ground potential so that a reverse voltage can be applied across both of the first diode D1 and the third diode D3. Therefore, when the output voltage of the AC power source 12 has negative polarity, the converter 10 has four states as shown in FIGS. 3A-3D.

Figure 3A:
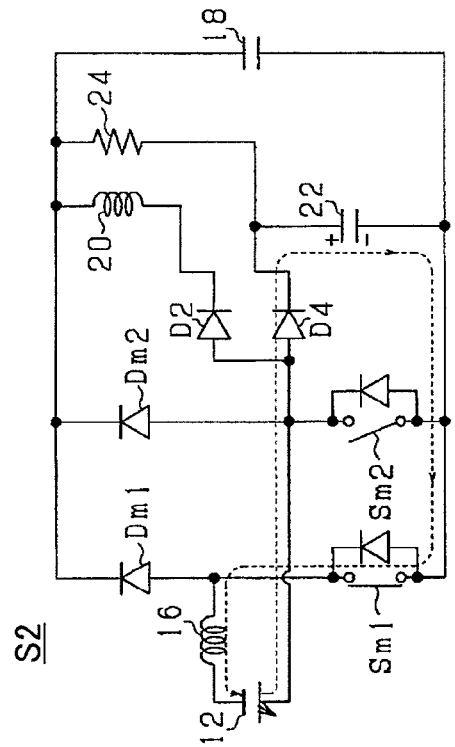
FIGS. 3A, 3B, 3C, and 3D are diagrams illustrating a current flow in the converter according to the first embodiment.

FIG. 3A shows a first state S1 where the second main switch Sm2 is ON under the condition that the first main switch Sm1 is kept ON. In the first state S1, the current flows through a closed loop circuit constructed with the AC power source 12, the second main switch Sm2, the first main switch Sm1, and the main inductor 16. Thus, magnetic energy is stored in the main inductor 16.

Figure 3B:
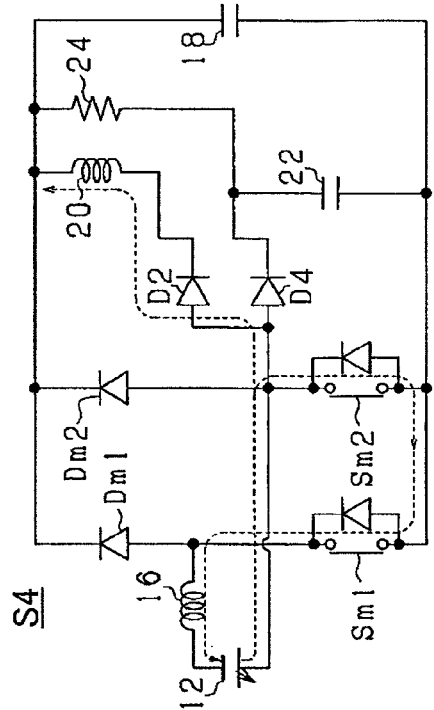

FIG. 3B shows a second state S2 subsequent to the first state S1 shown in FIG. 3A. When the second main switch Sm2 is turned OFF, there occurs a transition from the first state S1 to the second state S2. In the second state S2, the current flows through a closed loop circuit constructed with the AC power source 12, the fourth diode D4, the snubber capacitor 22, the first main switch Sm1, and the main inductor 16. In this case, when the second main switch Sm2 is turned OFF, a voltage between a pair of terminals of the second main switch Sm2 is limited by the speed at which the voltage of the snubber capacitor 22 increases. Therefore, a surge voltage occurring when the second main switch Sm2 is turned OFF can be reduced.

Figure 3C:
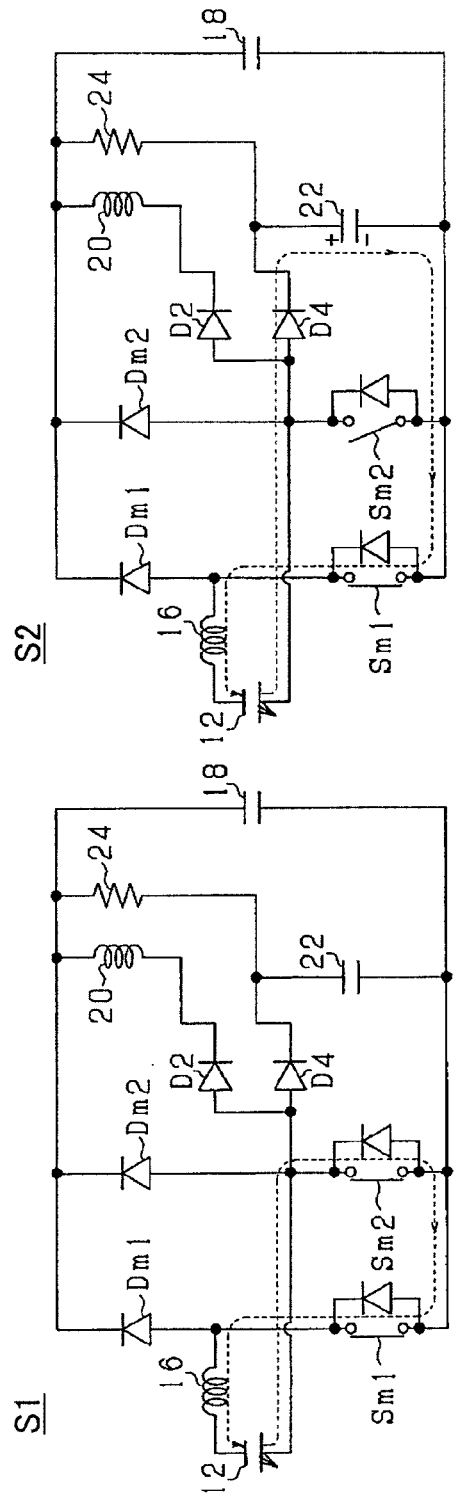

FIG. 3C shows a third state S3 subsequent to the second state S2 shown in FIG. 3B. When the voltage of the snubber capacitor 22 reaches the voltage of the smoothing capacitor 18 so that the current outputted from the main inductor 16 can flow through each of the second main diode Dm2 and the snubber inductor 20, there occurs a transition from the second state S2 to the third state S3. It is noted that when the second main switch Sm2 is turned OFF, the second diode D2 and the fourth diode D4 allow the current flowing in a first direction from the second connection point P2 toward the second diode D2 and the fourth diode D4 but prevent the current flowing in a second direction opposite to the first direction.

Figure 3D:
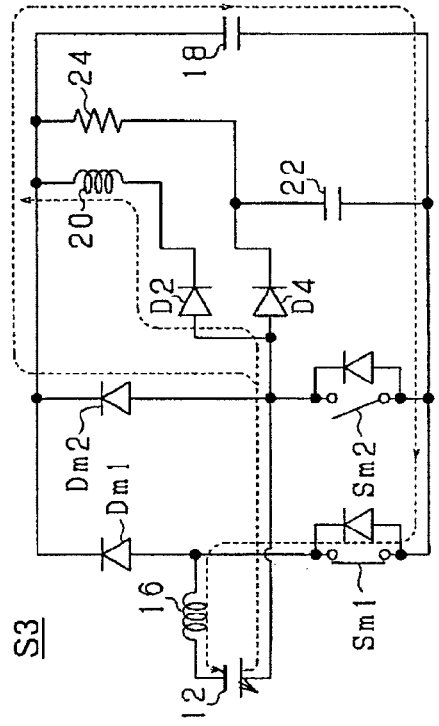

FIG. 3D shows a fourth state S4 subsequent to the third state S3 shown in FIG. 3C. When the second main switch Sm2 is turned ON, there occurs a transition from the third state S3 to the fourth state S4. According to the first embodiment, as described for the state 4 shown in FIG. 2D, a surge voltage occurring when the second main switch Sm2 is turned ON can be reduced by the action of the snubber inductor 20.

In the third state S3 shown in FIG. 3C and the fourth state S4 shown in FIG. 3D, the snubber capacitor 22 is discharged through the resistor 24, because the voltage of the snubber capacitor 22 increases above the voltage of the smoothing capacitor 18. When the current flowing through the snubber inductor 20 becomes zero in the fourth state S4, there occurs a transition from the fourth state S4 to the first state S1 shown in FIG. 3A.

As described above, according to the first embodiment, the snubber circuit is shared between the first main switch Sm1 and the second main switch Sm2 and also between the first main diode Dm1 and the second main diode Dm2. In such an approach, an increase in the number of components of the converter 10 due to addition of the snubber circuit is reduced. Accordingly, an increase in cost of the converter 10 can be reduced.

Second Embodiment

A second embodiment of the present disclosure is described below.

The second embodiment differs from the first embodiment in the configuration of the auxiliary section of the converter 10.

Figure 4:
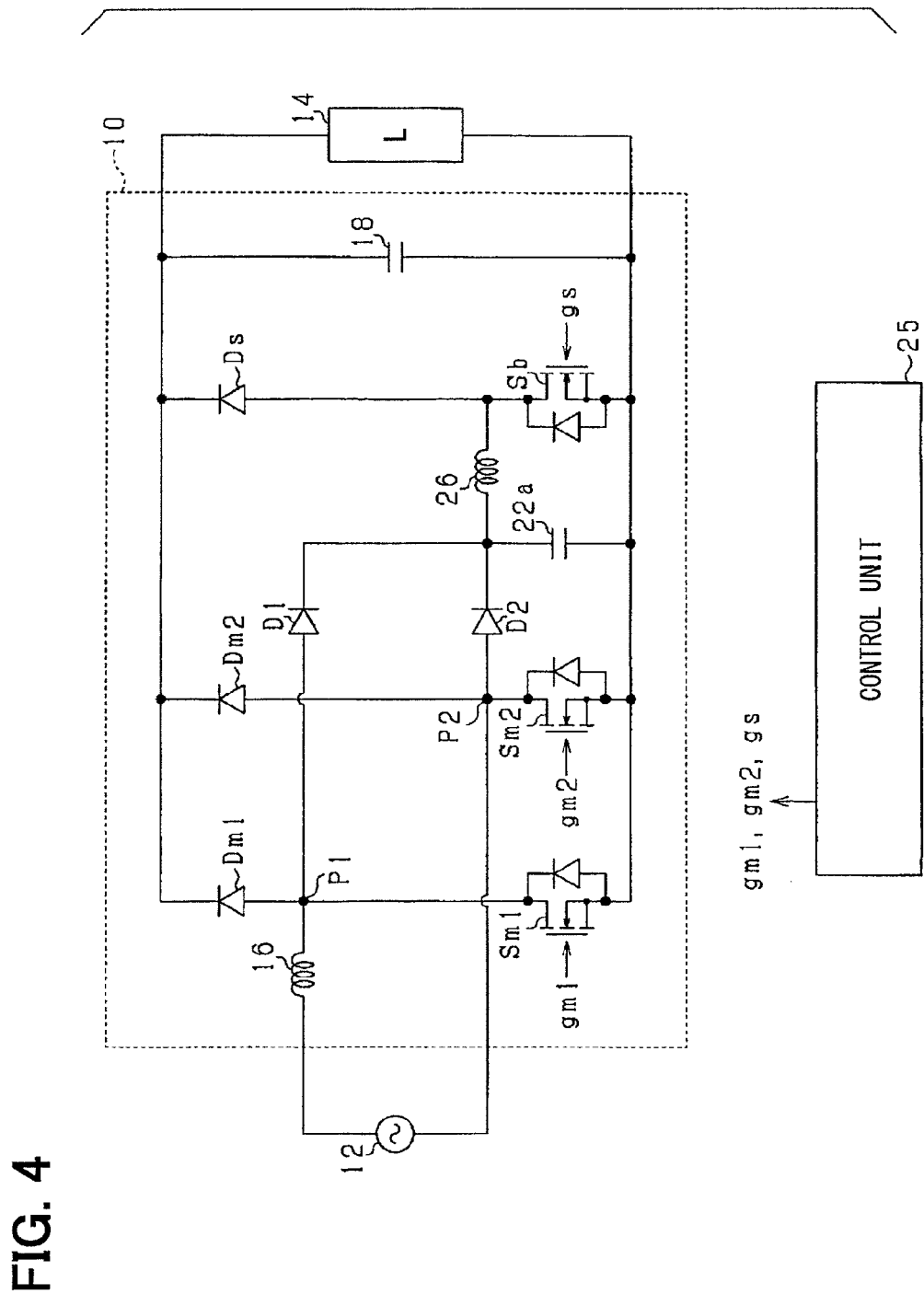
FIG. 4 is a diagram illustrating a system according to a second embodiment of the present disclosure.

FIG. 4 shows the converter 10 according to the second embodiment.

As shown in FIG. 4, the auxiliary section includes the first diode D1, the second diode D2, and a snubber circuit. The snubber circuit includes a secondary diode Ds, a snubber capacitor 22a, a secondary inductor 26 for storing energy, and a secondary switch Sb. According to the second embodiment, the secondary switch Sb is an N-channel MOSFET. Specifically, a series circuit of the first diode D1 and the snubber capacitor 22a is connected to the first main switch Sm1, and a series circuit of the second diode D2 and the snubber capacitor 22a is connected to the second main switch Sm2. It is noted that the cathodes of the first diode D1 and the second diode D2 are connected to the snubber capacitor 22a.

A series circuit of the secondary inductor 26 and the secondary switch Sb is connected in parallel to the snubber capacitor 22a. Specifically, a drain of the secondary switch Sb is connected to the secondary inductor 26. An anode of the secondary diode Ds is connected to a connection point between the secondary inductor 26 and the secondary switch Sb. A cathode of the secondary diode Ds is connected to the cathode of the second main diode Dm. The secondary switch Sb is controlled (i.e., turned ON and OFF) by a control signal gs outputted from the control unit 25.

Next, operations of the auxiliary section according to the second embodiment are described with reference to FIGS. 5A-5D.

FIGS. 5A-5D show a current flow in the converter 10 observed when the output voltage of the AC power source 12 has positive polarity. In this state, since the second main switch Sm2 is kept ON, the current always flows through the second main switch Sm2 so that a reverse voltage can be applied across the second diode D2. Therefore, when the output voltage of the AC power source 12 has positive polarity, the converter 10 has four states as shown in FIGS. 5A-5D.

FIG. 5A shows a first state S1. In the main section, the first state S1 shown in FIG. 5A is the same as the first state S1 shown in FIG. 2A. In the auxiliary section, the secondary switch Sb is OFF.

FIG. 5B shows a second state S2 subsequent to the first state S1 shown in FIG. 5A. When the first main switch Sm1 is turned OFF, there occurs a transition from the first state S1 to the second state S2. In the second state S2, the current flows through a closed loop circuit constructed with the AC power source 12, the main inductor 16, the first diode D1, the snubber capacitor 22a, and the second main switch Sm2. In this case, when the first main switch Sm1 is turned OFF, the voltage between the pair of terminals of the first main switch Sm1 is limited by a speed at which a voltage of the snubber capacitor 22a increases. Therefore, a surge voltage occurring when the first main switch Sm1 is turned OFF can be reduced.

Then, when the voltage of the snubber capacitor 22a reaches the voltage of the smoothing capacitor 18, the current outputted from the main inductor 16 flows through the first main diode Dm1.

FIG. 5C shows a third state S3 subsequent to the second state S2 shown in FIG. 5B. When the first main switch Sm1 is turned ON, and the secondary switch Sb is turned ON, there occurs a transition from the second state S2 to the third state S3. In the third state S3, the snubber capacitor 22 is discharged so that the current can flow through a closed loop circuit constructed with the snubber capacitor 22a, the secondary inductor 26, and the secondary switch Sb. In this way, electrical energy stored in the snubber capacitor 22a is transferred to the secondary inductor 26.

FIG. 5D shows a fourth state S4 subsequent to the third state S3 shown in FIG. 5C. When the secondary switch Sb is turned OFF, there occurs a transition from the third state S3 to the fourth state S4. In the fourth state S4, magnetic energy stored in the secondary inductor 26 produces the current flowing in a direction from the secondary inductor 26 to the secondary diode Ds.

When the voltage of the snubber capacitor 22 gradually decreases to zero in the fourth state S4, there occurs a transition from the fourth state 64 to the first state S1 shown in FIG. 5A. Because of the transfer of the charge in the snubber capacitor 22a in the third state S3 and the fourth state S4, the energy stored in the snubber capacitor 22a is outputted to the smoothing capacitor 18 side without any loss of energy in theory and used as output energy. That is, the snubber circuit according to the second embodiment is a lossless snubber circuit.

By the way, when the output voltage of the AC power source 12 has negative polarity, the auxiliary section operates in the same manner as described above for when the output voltage of the AC power source 12 has positive polarity. Therefore, the description of the operations of the auxiliary section observed when the output voltage of the AC power source 12 has negative polarity is omitted.

As described above, according to the second embodiment, the snubber circuit has a lot of components. However, since the snubber circuit is shared between the first main switch Sm1 and the second main switch Sm2, an increase in the number of components of the converter 10 due to addition of the snubber circuit is reduced. Accordingly, an increase in cost of the converter 10 can be reduced.

Third Embodiment

A third embodiment of the present disclosure is described below.

The third embodiment differs from the first embodiment in the configuration of the auxiliary section of the converter 10.

Figure 6:
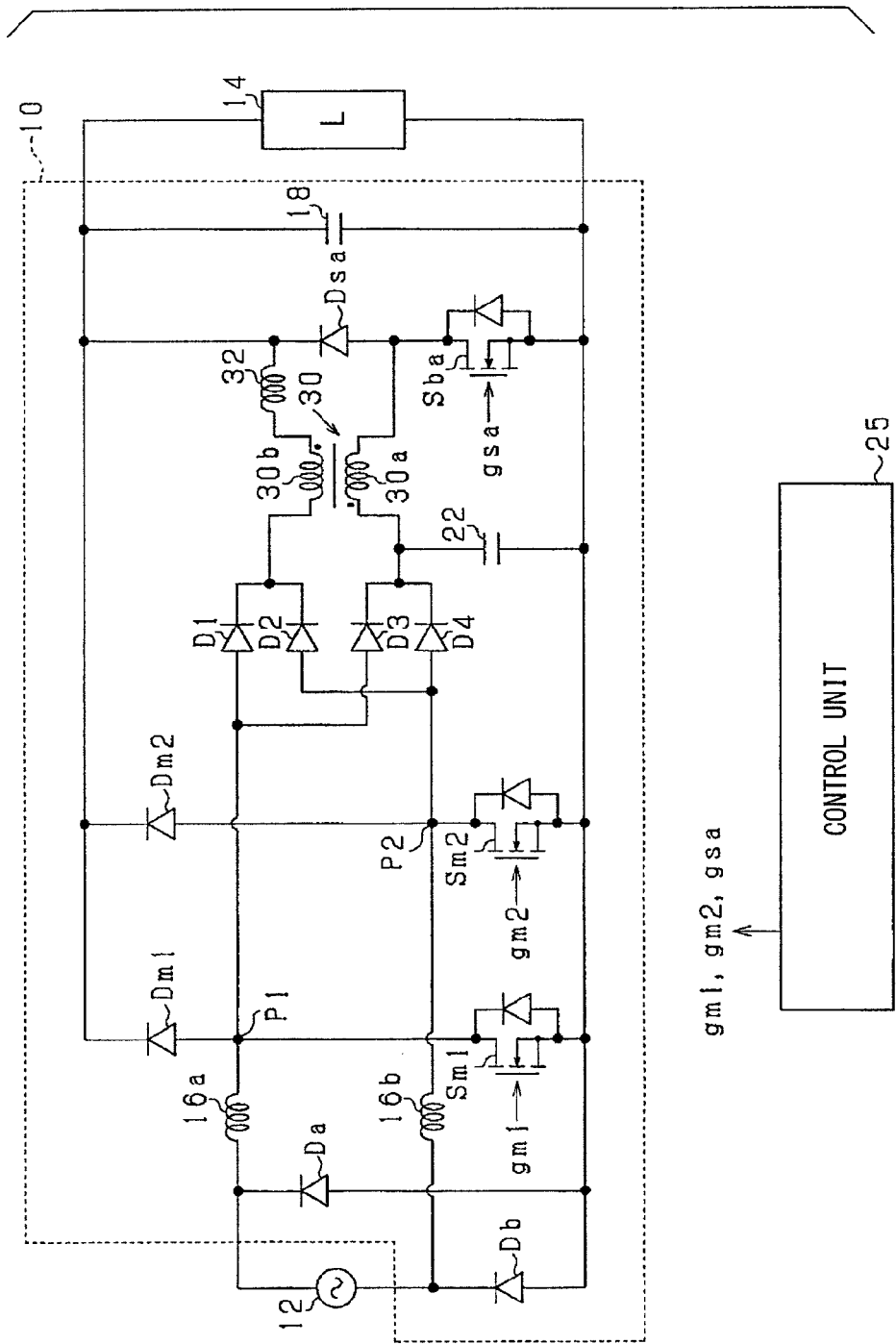
FIG. 6 is a diagram illustrating a system according to a third embodiment of the present disclosure.

FIG. 6 shows the converter 10 according to the third embodiment.

As shown in FIG. 6, the auxiliary section includes the first diode D1, the second diode D2, the third diode D3, the fourth diode D4, and a snubber circuit. The snubber circuit includes the snubber capacitor 22, a secondary diode Dsa, a secondary switch Sba, and a transformer 30. According to the third embodiment, the secondary switch Sba is an N-channel MOSFET. Specifically, a series circuit of a primary coil 30a of the transformer 30 and the secondary switch Sba is connected to the snubber capacitor 22. It is noted that a drain of the secondary switch Sba is connected to the primary coil 30a. The secondary switch Sba is controlled (i.e., turned ON and OFF) by a control signal gsa outputted from the control unit 25.

An anode of the secondary diode Dsa is connected to a connection point between the primary coil 30a and the secondary switch Sba. A cathode of the secondary diode Dsa is connected to the cathode of the second main diode Dm2. Further, the cathode of the secondary diode Dsa is connected to the cathodes of the first diode D1 and the second diode D2 through a series circuit of a secondary coil 30b of the transformer 30 and a secondary inductor 32.

The number of turns of the primary coil 30a is sufficiently larger than the number of turns of the secondary coil 30b. According to the third embodiment, the secondary inductor 32 is provided by a leakage inductance of the transformer 30.

By the way, according to the third embodiment, since the converter 10 is configured as a semi-bridgeless PFC circuit, the main inductor 16 is divided. Specifically, the first connection point P1 is connected to the second connection point P2 through a first main inductor 16a, the AC power source 12, and a second main inductor 18b. Further, a connection point between the first main inductor 16a and the AC power source 12 is connected to a cathode of a first auxiliary diode Da, and a connection point between the AC power source 12 and the second main inductor 16b is connected to a cathode of a second auxiliary diode Db. Anodes of the first auxiliary diode Da and the second auxiliary diode Db are connected to the source of the first main switch Sm1.

Next, operations of the auxiliary section according to the third embodiment are described with reference to FIGS. 7A-7D and FIGS. 8A-8D. When the output voltage of the AC power source 12 has negative polarity, the auxiliary section operates in the same manner as when the output voltage of the AC power source 12 has positive polarity. Therefore, the description of the operations of the auxiliary section observed when the output voltage of the AC power source 12 has negative polarity is omitted.

FIGS. 7A-7D and FIGS. 8A-6D show a current flow in the converter 10 observed when the output voltage of the AC power source 12 has positive polarity. In this state, since the second main switch Sm2 is kept OFF, the current flows through the second auxiliary diode Db in the forward direction so that a reverse voltage can be applied across each of the second diode D2 and the fourth diode D4. Therefore, when the output voltage of the AC power source 12 has positive polarity, the converter 10 has eight states as shown in FIGS. 7A-7D and FIGS. 8A-8D.

Figure 7A:
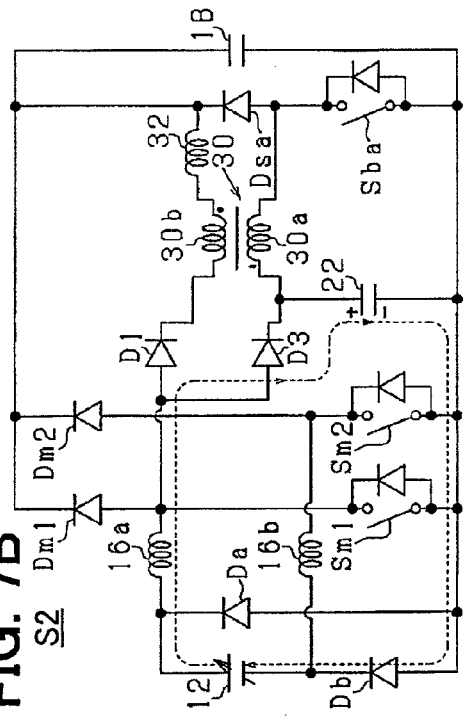
FIGS. 7A, 7B, 7C, and 7D are diagrams illustrating a current flow in a converter according to the third embodiment.

FIG. 7A shows a first state S1 where the first main switch Sm1 is ON. In the first state S1, the current flows through a closed loop circuit constructed with the AC power source 12, the first main Inductor 16a, the first main switch Sm1, and the second auxiliary diode Db. Thus, magnetic energy is stored in the first main inductor 16a.

Figure 7B:
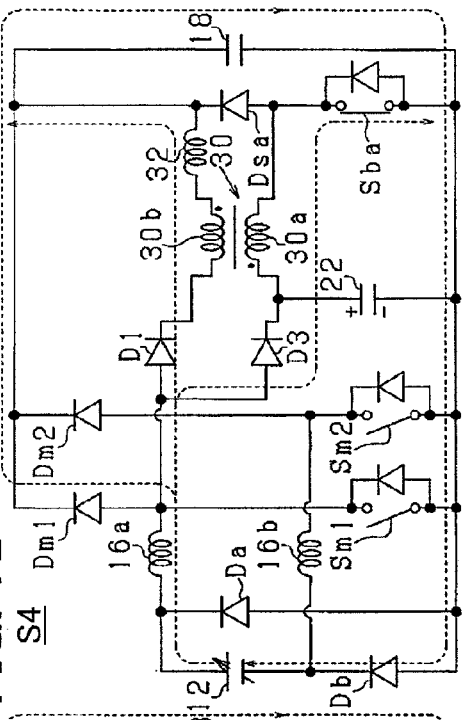

FIG. 7B shows a second state S2 subsequent to the first state S1 shown in FIG. 7A. When the first main switch Sm1 is turned OFF, there occurs a transition from the first state S1 to the second state S2. In the second state S2, the current outputted from the first main inductor 16a flows to the snubber capacitor 22 through the third diode D3. At this time, the voltage between the pair of terminals of the first main switch Sm1 is limited by the speed at which the voltage of the snubber capacitor 22 increases. Therefore, a surge voltage occurring when the first main switch Sm1 is turned OFF can be reduced.

Figure 7C:
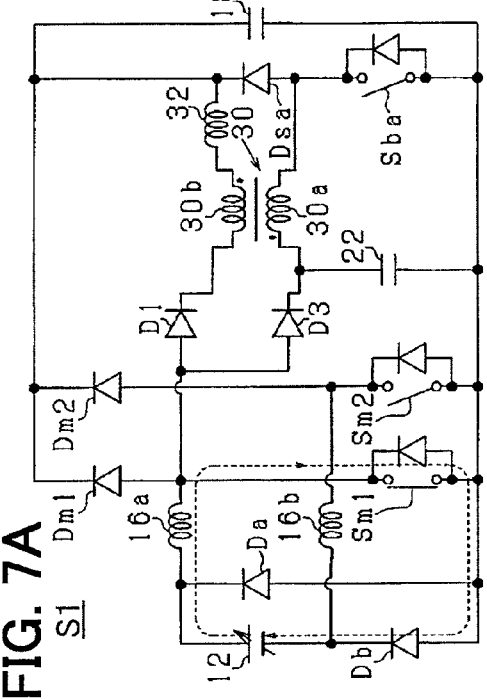

FIG. 7C shows a third state S3 subsequent to the second state S2 shown in FIG. 7B. When the voltage of the snubber capacitor 22a reaches the voltage of the smoothing capacitor 18, there occurs a transition from the second state S2 to the third state S3. In the third state S3, the current outputted from the first main inductor 16a flows to the smoothing capacitor 18 side through the first main diode Dm1.

Figure 7D:
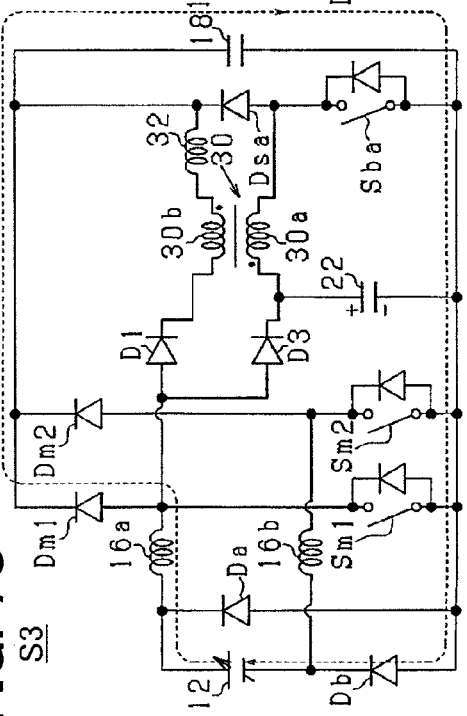

FIG. 7D shows a fourth state S4 subsequent to the third state S3 shown in FIG. 7C. When the secondary switch Sba is turned ON before the first main switch Sm1 is turned ON, there occurs a transition from the third state S3 to the fourth state S4. In the fourth state S4, the current is commutated from the first main diode Dm1 toward the secondary coil 30b of the transformer 30. Therefore, while the current flowing through the first main diode Dm1 gradually decreases, the current flowing through the secondary coil 30b gradually increases. That is, when the secondary switch Sba is turned ON, part of the current flowing through the first main inductor 16a flows to the secondary switch Sba through the third diode D3 and the primary coil 30a. As shown in the drawings, polarities of the coils 30a and 30b are set such that when a voltage which is positive on the third diode D3 side is applied to the primary coil 30a, a voltage which is positive on the secondary inductor 32 side is applied to the secondary coil 30b. Therefore, when the current flows through the primary coil 30a, the current also flows through the secondary coil 30b. In this case, since the number of turns of the primary coil 30a is larger than the number of turns of the secondary coil 30b, the current is sufficiently large compared to the current flowing through the secondary switch Sba. At this time, magnetic energy is stored in the transformer 30 and the secondary inductor 32.

FIG. 8A shows a fifth state S5 subsequent to the fourth state S4 shown in FIG. 7D. When the first main switch Sm1 is turned ON after the current flowing through the first main diode Dm1 becomes zero, there occurs a transition from the fourth state S4 to the fifth state S5. When the first main switch Sm1 is turned ON, the current flowing through the secondary inductor 32 gradually decreases, and the current flowing through the first main switch Sm1 gradually increases accordingly. Since the gradual increase speed is limited by an inductance of the secondary inductor 32, a surge voltage occurring when the first main switch Sm1 is turned ON can be reduced.

Further, when the first main switch Sm1 is turned ON, the first connection point P1 decreases close to ground potential. Therefore, the snubber capacitor 22 is discharged so that current can flow through the secondary switch Sba.

As described above, the secondary inductor 32 has a function of limiting the gradual increase of the speed in the current flowing though the first main switch Sm1 In contrast, if there is no secondary inductor 32, the transformer 30 cannot be an ideal transformer and needs to have a leakage inductance for the following reasons. In the case of an ideal transformer, a relationship between the voltage of the primary coil 30a and the voltage of the secondary coil 30b depends on the turn ratio. Therefore, the voltage of the secondary coil 30b cannot be increased to the output voltage of the converter 10. As a result, the turn on of the first main switch Sm1 does not induce current flow through the secondary coil 30b.

FIG. 8B shows a sixth state S6 subsequent to the fifth state S5 shown in FIG. 8A. When the secondary switch Sba is turned OFF, there occurs a transition from the fifth state S5 to the sixth state S6. In the sixth state S6, since the magnetic energy stored in the transformer 30 is released through the secondary diode Dsa, the snubber capacitor 22 continues to be discharged.

FIG. 8C shows a seventh state S7 subsequent to the sixth state S6 shown in FIG. 8B. When the current flowing through the first main inductor 16a entirely flows through the first main switch Sm1, there occurs a transition from the sixth state S6 to the seventh state S7.

FIG. 8D shows an eighth state S8 subsequent to the seventh state S7 shown in FIG. 8C. When the snubber capacitor 22 is fully discharged, there occurs a transition from the seventh state S7 to the eighth state S8. In the eighth state S8, because of the magnetic energy stored in the transformer 30, part of the current flowing through the first main inductor 16a flows into the transformer 30. Then, when the magnetic energy stored in the transformer 30 becomes zero in the eighth state S8 so that the entire current flowing through the first main inductor 16a can flow through the first main switch Sm1, there occurs a transition from the eighth state S8 to the first state S1 shown in FIG. 7A.

It is noted that one cycle of the operation of the auxiliary section is defined as one cycle of an ON and OFF operation of the first main switch Sm1. The energy of the snubber capacitor 22 discharged in the fifth, sixth, and seventh state S7s shown in FIGS. 8A-8C is outputted to the smoothing capacitor 18 side without any loss of energy in theory and used as output energy.

Next, operations of the auxiliary section in a discontinuous current mode where the current flowing through the first main inductor 16a remains zero for a finite time are described with reference to FIGS. 9A-9D. In FIGS. 9A-9D, a state number is assigned to correspond to the state number shown in FIGS. 7A-7D and 8A-8D.

Figure 9A:
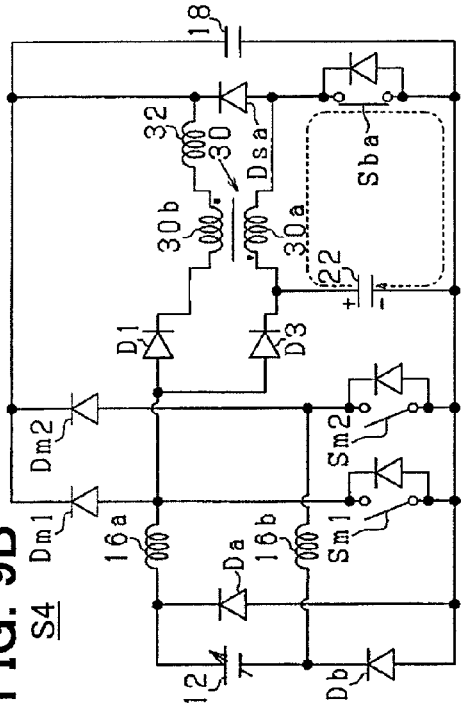
FIGS. 9A, 9B, 9C, and 9D are diagrams illustrating a current flow in a converter according to the third embodiment.

FIG. 9A shows a third state S3 where the current flowing through the first main inductor 16a is zero.

Figure 9B:
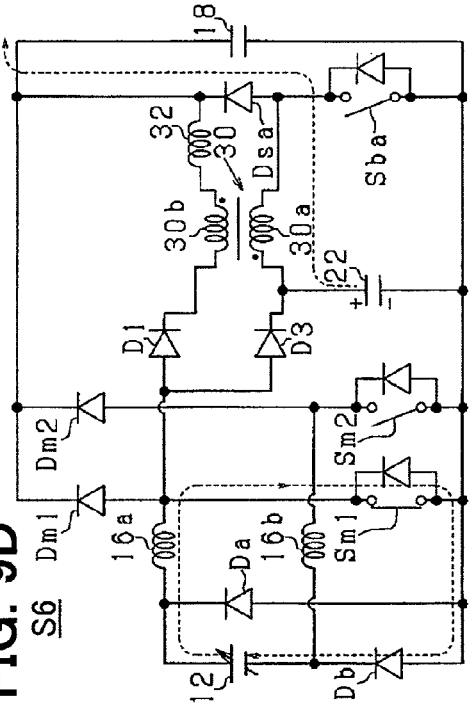

FIG. 9B shows a fourth state S4 subsequent to the third state S3 shown in FIG. 9A. When the secondary switch Sb is turned ON, there occurs a transition from the third state S3 to the fourth state S4. In the fourth state S4, the snubber capacitor 22 is discharged through the primary coil 30a of the transformer 30 and the secondary switch Sba. However, at this time, no current flows through the secondary coil 30b of the transformer 30. The reason for this is that since the number of turns of the secondary coil 30b is smaller than the number of turns of the primary coil 30a, a voltage induced in the secondary coil 30b becomes smaller than the voltage of the smoothing capacitor 18. Therefore, the primary coil 30a functions as an inductor and stores the energy discharged by the snubber capacitor 22 as magnetic energy.

Figure 9C:
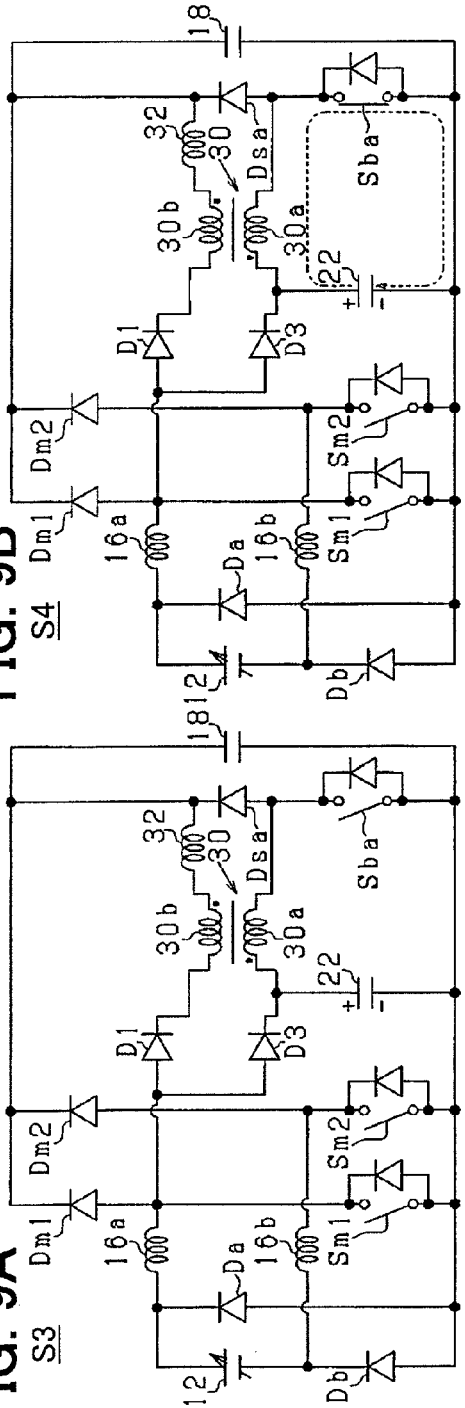

FIG. 9C shows a fifth state S5 subsequent to the fourth state S4 shown in FIG. 9B. When the first main switch Sm1 is turned ON, there occurs a transition from the fourth state S4 to the fifth state S5. In the fifth state S5, a speed at which the current flowing through the first main switch Sm1 gradually increases is limited by an inductance of the first main inductor 16a. Therefore, a surge voltage occurring when the first main switch Sm1 is turned ON can be reduced.

Figure 9D:
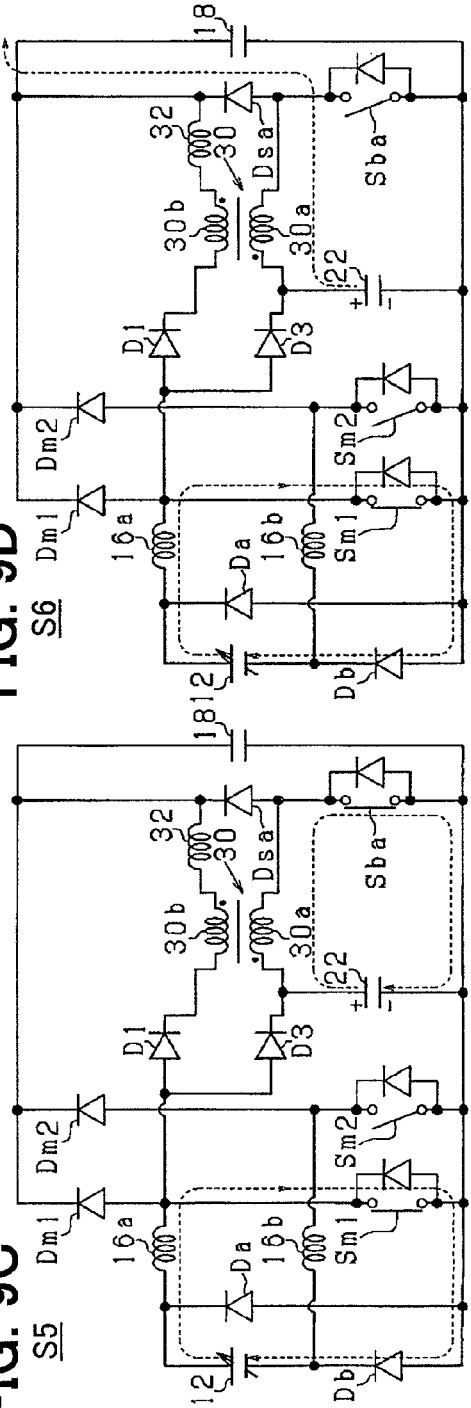

FIG. 9D shows a sixth state S6 subsequent to the fifth state S5 shown in FIG. 9C. When the secondary switch Sba is turned OFF, there occurs a transition from the fifth state S5 to the sixth state S6. In the sixth state S6, the magnetic energy stored in the transformer 30 is outputted to the smoothing capacitor 18 side through the primary coil 30a and the secondary diode Dsa. In this way, the energy stored in the snubber capacitor 22 is used as output energy without any loss of energy in theory. Then, when the voltage of the snubber capacitor 22 becomes zero, there occurs a transition to the first state S1 shown in FIG. 7A.

Like the second embodiment, the third embodiment described above can reduce the increase in cost of the converter 10, Fourth Embodiment A fourth embodiment of the present disclosure is described below, The fourth embodiment differs from the first embodiment in the configuration of the auxiliary section of the converter 10.

Figure 10:
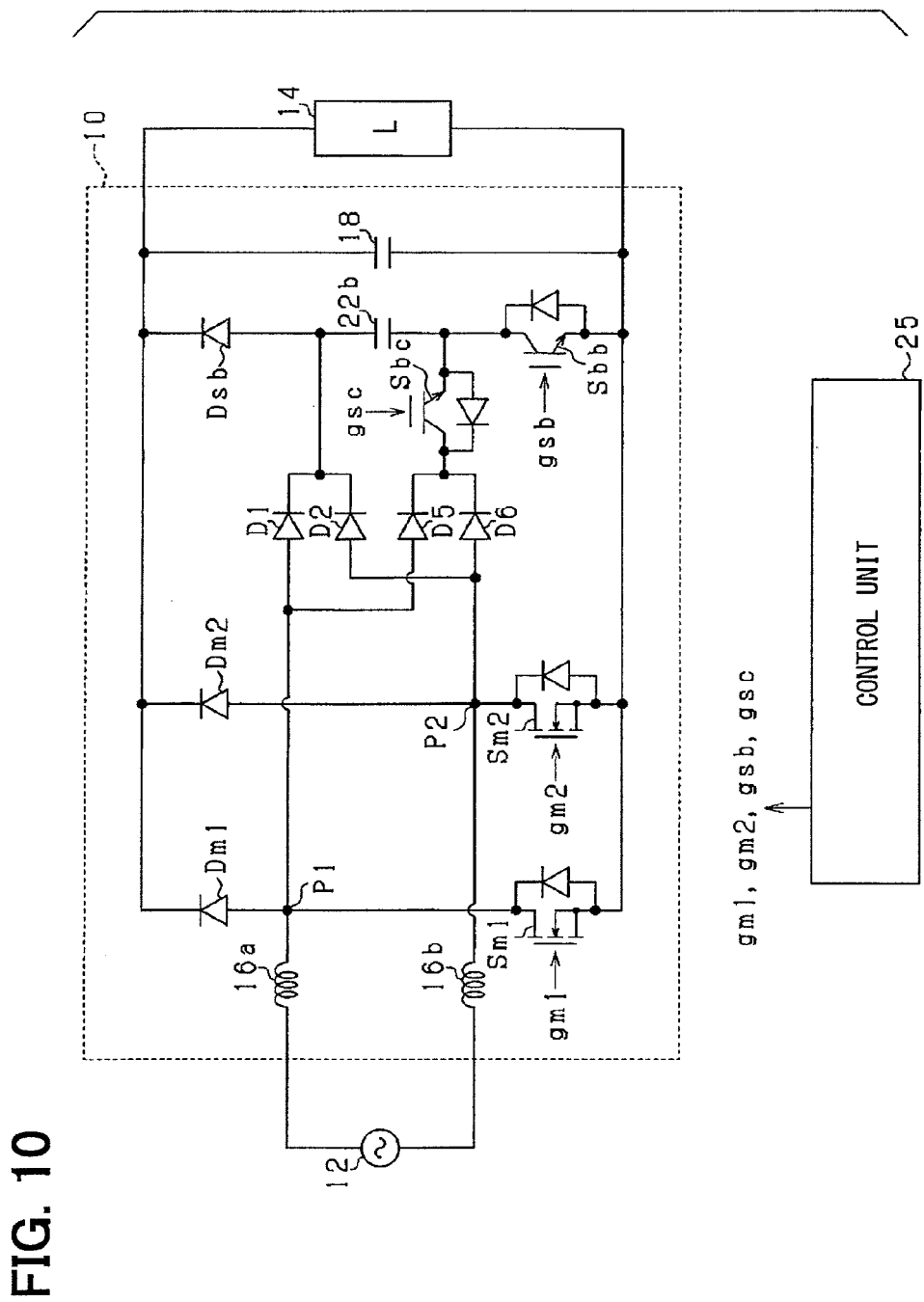
FIG. 10 is a diagram illustrating a system according to a fourth embodiment of the present disclosure.

FIG. 10 shows the converter 10 according to the fourth embodiment.

As shown in FIG. 10, the auxiliary section of the converter 10 has a snubber circuit including a fifth diode D5, a sixth diode D6, a snubber capacitor 22b, a secondary diode Dab, a first secondary switch Sbb, and a second secondary switch Sbc. According to the fourth embodiment, each of the first secondary switch Sbb and the second secondary switch Sbc is an insulated gate bipolar transistor (IGBT) with an antiparallel diode. It is noted that the first secondary switch Sbb corresponds to a first secondary switch recited in claims, the second secondary switch Sbc corresponds to a second secondary switch recited in claims, the secondary diode Dsb corresponds to a first secondary block device recited in claims, the fifth diode D5 corresponds to a second secondary block device recited in claims, and the sixth diode D6 corresponds to a third secondary block device.

The auxiliary section is described in detail below. The first main switch Sm1 is connected in parallel to a series circuit of the first diode D1, the snubber capacitor 22b, and the first secondary switch Sbb. Specifically, the cathode of the first diode D1 is connected to the snubber capacitor 22b, and a collector of the first secondary switch Sbb is connected to the snubber capacitor 22b.

The second main switch Sm2 is connected in parallel to a series circuit of the second diode D2, the snubber capacitor 22b, and the first secondary switch Sbb. Specifically, the cathode of the second diode D2 is connected to the snubber capacitor 22b.

An anode of the fifth diode D5 is connected to the first connection point P1, and an anode of the sixth diode D6 is connected to the second connection point P2. Cathodes of the fifth diode D5 and the sixth diode D6 are connected through the second secondary switch Sbc to a connection point between the snubber capacitor 22b and the first secondary switch Sbb. Specifically, the cathodes of the fifth diode D5 and the sixth diode D6 are connected to a collector of the second secondary switch Sbc.

An anode of the secondary diode Dab is connected to a connection point between the snubber capacitor 22b and each of the cathodes of the first diode D1 and the second diode D2. A cathode of the secondary diode Dab is connected to the cathode of the second main diode Dm2.

The first and second secondary switches Sbb and Sbc are controlled (i.e., turned ON and OFF) by control signals gab and gsc outputted from the control unit 25, respectively. In the fourth embodiment, like in the third embodiment, the main inductor 16 is divided into the first main inductor 16a and the second main inductor 16b.

Figure 11A:
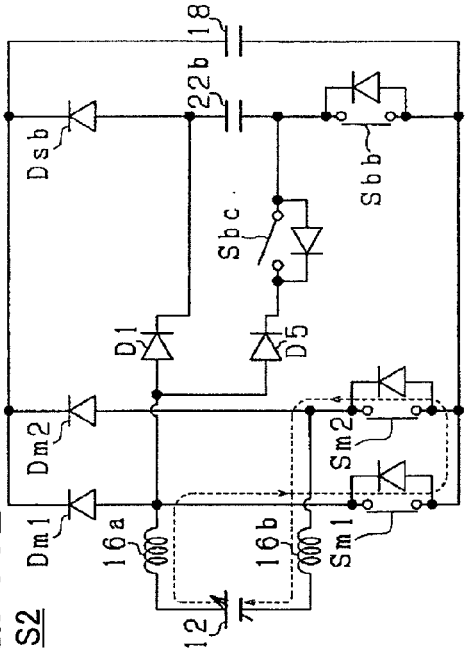
FIGS. 11A, 11B, 11C, and 11D are diagrams illustrating a current flow in a converter according to the fourth embodiment.

Next, operations of the auxiliary section according to the fourth embodiment are described with reference to FIGS. 11A-11D and FIGS. 12A-12D. When the output voltage of the AC power source 12 has negative polarity, the auxiliary section operates in the same manner as when the output voltage of the AC power source 12 has positive polarity. Therefore, the description of the operations of the auxiliary section observed when the output voltage of the AC power source 12 has negative polarity is omitted, FIGS. 11A-11D and FIGS. 12A-12D show a current flow in the converter 10 observed when the output voltage of the AC power source 12 has positive polarity. In this state, a reverse voltage is applied across each of the second diode D2 and the sixth diode D6. Therefore, when the output voltage of the AC power source 12 has positive polarity, the converter 10 has eight states as shown in 11A-11D and FIGS. 12A-12D, FIG. 11A shows a first state S1. In the main section, the first state S1 shown in FIG. 11A is the same as the first state S1 shown in FIG. 2A. In the auxiliary section, the first secondary switch Sbb is OFF, and the second secondary switch Sbc is ON.

Figure 11B:
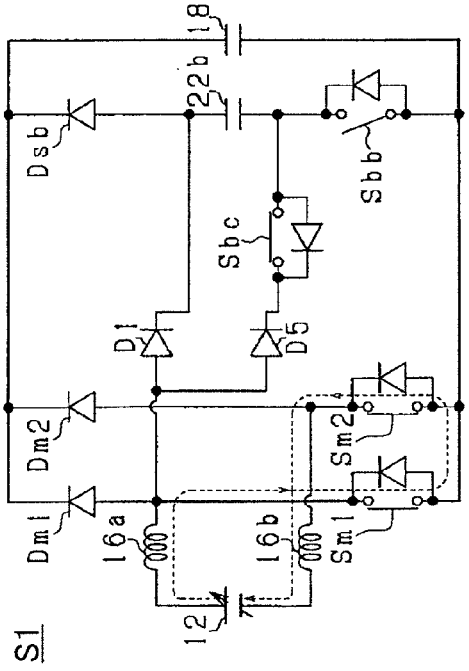

FIG. 11B shows a second state S2 subsequent to the first state S1 shown in FIG. 11A. When the first secondary switch Sbb is turned ON, and the second secondary switch Sbc is turned OFF, there occurs a transition from the first state S1 to the second state S2. In the second state S2, the first main switch Sm1 is connected in parallel to the snubber capacitor 22b. Since no charge is stored in the snubber capacitor 22b, no loss of energy occurs when the first secondary switch Sbb is turned ON.

Figure 11C:
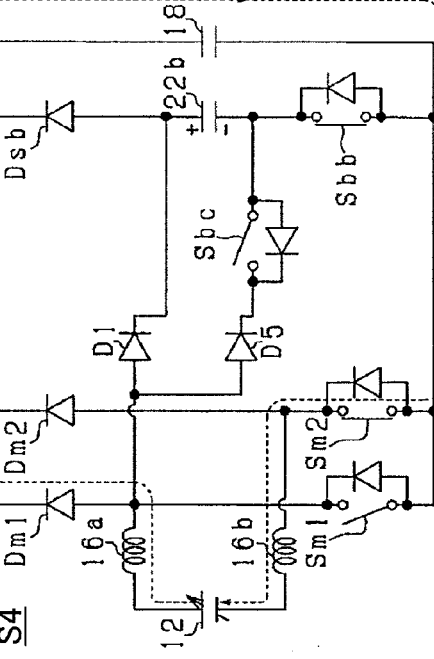

FIG. 11C shows a third state S3 subsequent to the second state S2 shown in FIG. 11B. When the first main switch Sm1 is turned OFF, there occurs a transition from the second state S2 to the third state S3. At this time, the voltage between the pair of terminals of the first main switch Sm1 is limited by a speed at which a voltage of the snubber capacitor 22b increases. Therefore, a surge voltage occurring when the first main switch Sm1 is turned OFF can be reduced.

Figure 11D:
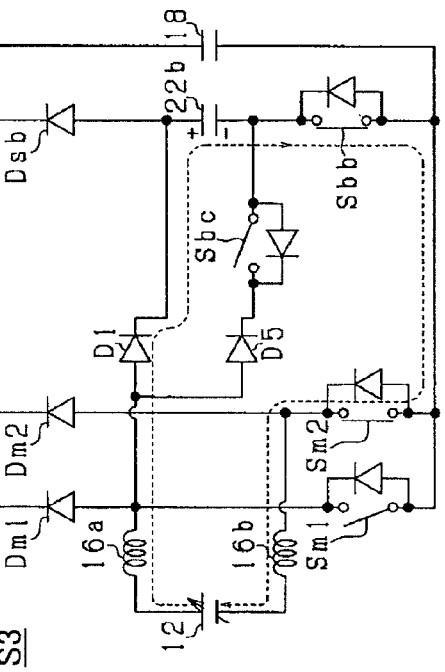

FIG. 11D shows a fourth state S4 subsequent to the third state S3 shown in FIG. 11C. When the voltage of the snubber capacitor 22b reaches the voltage of the smoothing capacitor 18, there occurs a transition from the third state S3 to the fourth state S4. In the fourth state S4, the currant outputted from the first and second main inductors 16a and 16b is outputted through the first main diode Dm1.

Figure 12A:
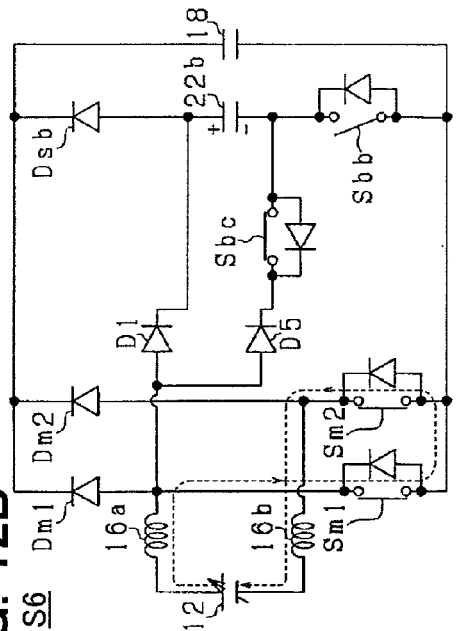
FIGS. 12A, 12B, 12C, and 12D are diagrams illustrating a current flow in a converter according to the fourth embodiment.

FIG. 12A shows a fifth state S5 subsequent to the fourth state S4 shown in FIG. 11D. When the first main switch Sm1 is turned ON, there occurs a transition from the fourth state S4 to the fifth state S5. It is noted that since a reverse voltage is applied across the first diode D1, the snubber capacitor 22b is disconnected from the first main switch Sm1. Therefore, when the first main switch Sm1 is turned ON, the snubber capacitor 22b is not discharged.

Figure 12B:
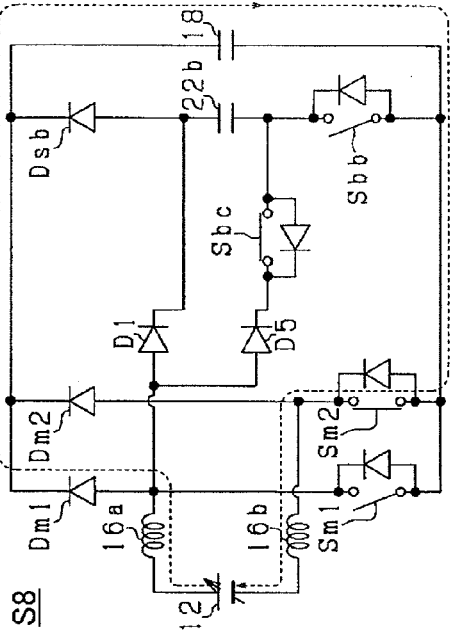

FIG. 12B shows a sixth state S6 subsequent to the fifth state S5 shown in FIG. 12A. When the first secondary switch Sbb is turned OFF, and the second secondary switch Sbc is turned ON, there occurs a transition from the fifth state S5 to the sixth state S6. At this time, the voltage of the snubber capacitor 22b is equal to the voltage of the smoothing capacitor 18. Therefore, no current flows through the second secondary switch Sbc, when the second secondary switch Sbc is turned ON. Thus, no loss of energy occurs when the second secondary switch Sbc is turned ON.

Figure 12C:
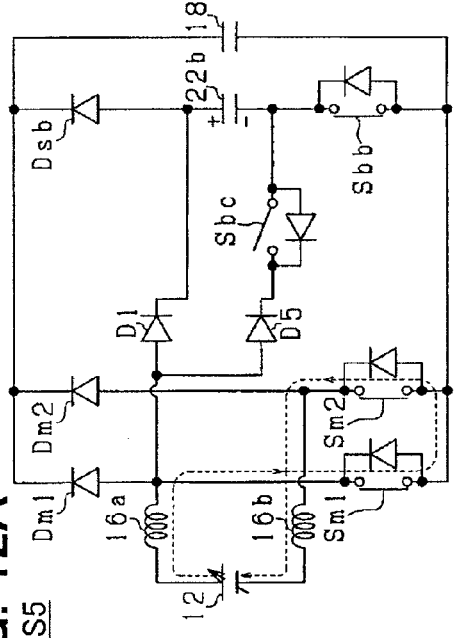

FIG. 12C shows a seventh state S7 subsequent to the sixth state S6 shown in FIG. 12B. When the first main switch Sm1 is turned OFF, there occurs a transition from the sixth state S6 to the seventh state S7. In the seventh state S7, the current outputted from the first and second main inductors 16a and 16b is outputted to the smoothing capacitor 18 side through the second secondary switch Sbc, the snubber capacitor 22b, and the secondary diode Dsb. At this time, a speed at which the voltage of the first main switch Sm1 increases is limited by a speed at which the voltage of the snubber capacitor 22b decreases (at which the snubber capacitor 22b is discharged). Therefore, a surge voltage occurring when the first main switch Sm1 is turned OFF can be reduced.

Figure 12D:
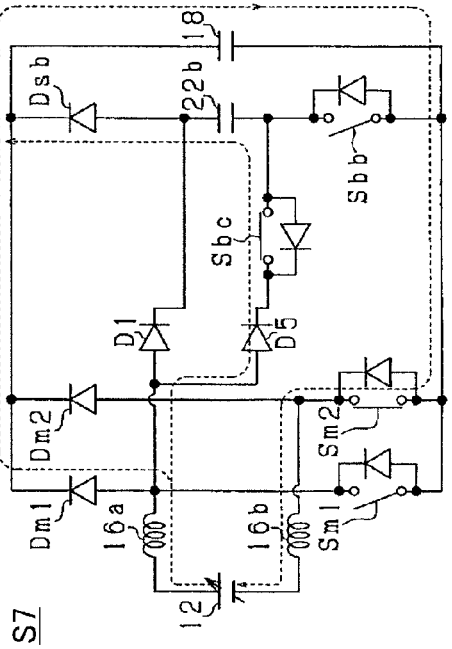

FIG. 12D shows an eighth state S8 subsequent to the seventh state S7 shown in FIG. 12C. When the current flowing through the second secondary switch Sbc becomes zero, there occurs a transition from the seventh state S7 to the eighth state S8. Then, when the first main switch Sm1 is turned ON, there occurs a transition to the first state S1 shown in FIG. 11A.

It is noted that one cycle of the operation of the auxiliary section according to the fourth embodiment is defined as two cycles of an ON and OFF operation of the first main switch Sm1. That is, the snubber capacitor 22b is charged by the ON and OFF operation of the first main switch Sm1 in the first cycle and discharged by the ON and OFF operation of the first main switch Sm1 in the next cycle.

Like the second embodiment, the fourth embodiment described above can reduce the increase in cost of the converter 10. Further, the auxiliary section according to the fourth embodiment has no magnetic component. Accordingly, the size of the auxiliary section can be reduced.

Fifth Embodiment

A fifth embodiment of the present disclosure is described below.

Figure 13:
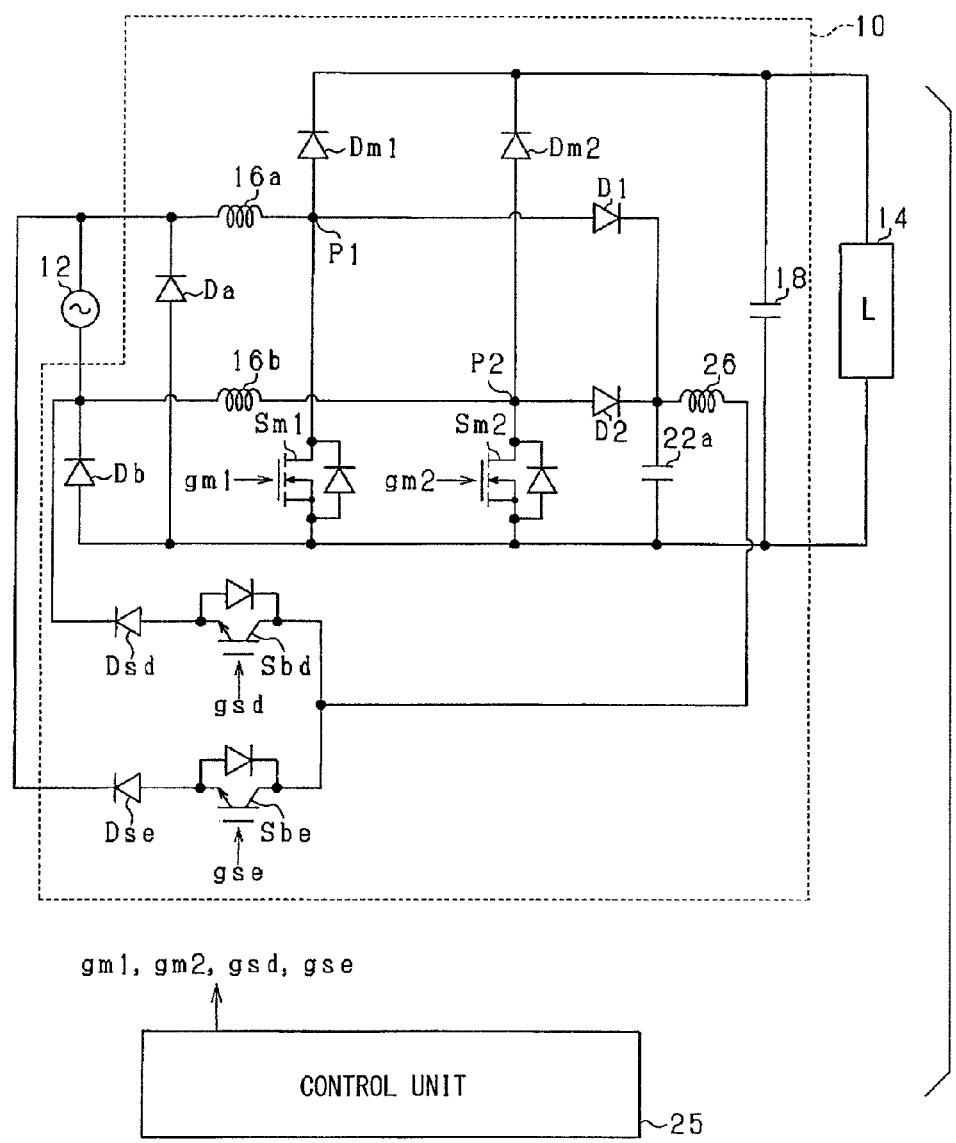
FIG. 13 is a diagram illustrating a system according to a fifth embodiment of the present disclosure.

The fifth embodiment differs from the second embodiment in the configuration of the auxiliary section of the converter 10, FIG. 13 shows the converter 10 according to the fifth embodiment.

As shown in FIG. 13, in the fifth embodiment, like in the third embodiment, the converter 10 is configured as a semi-bridgeless PFC circuit. The auxiliary section has a snubber circuit including the snubber capacitor 22a, the secondary inductor 26, a first secondary switch Sbd, a second secondary switch Sbe, a first secondary diode Dsd, and a second secondary diode Dse. According to the fifth embodiment, each of the first secondary switch Sbd and the second secondary switch Sbe is an IGBT with an antiparallel diode.

A first end of the secondary inductor 26 is connected to the snubber capacitor 22a. A second end of the secondary inductor 26 is connected to the cathode of the second auxiliary diode Db through a series circuit of the first secondary switch Sbd and the first secondary diode Dsd. Specifically, an emitter of the first secondary switch Sbd is connected to an anode of the first secondary diode Dsd. The second end of the secondary inductor 26 is also connected to the cathode of the first auxiliary diode Da through a series circuit of the second secondary switch Sbe and the second secondary diode Dse. Specifically, an emitter of the second secondary switch Sbe is connected to an anode of the second secondary diode Dse.

Next, operations of the auxiliary section according to the fifth embodiment are described with reference to FIGS. 14A-14D. When the output voltage of the AC power source 12 has negative polarity, the auxiliary section operates in the same manner as when the output voltage of the AC power source 12 has positive polarity. Therefore, the description of the operations of the auxiliary section observed when the output voltage of the AC power source 12 has negative polarity is omitted.

FIGS. 14A-14D show a current flow in the converter 10 observed when the output voltage of the AC power source 12 has positive polarity. In this state, a reverse voltage is applied across the second diode D2. Therefore, when the output voltage of the AC power source 12 has positive polarity, the converter 10 has four states as shown in FIGS. 14A-14D.

Figure 14A:
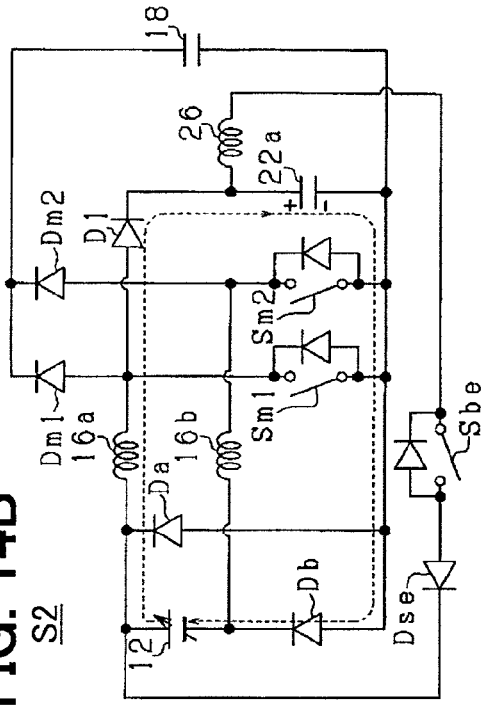
FIGS. 14A, 14B, 14C, and 14D are diagrams illustrating a current flow in a converter according to the fifth embodiment.

FIG. 14A shows a first state S1 where the first main switch Sm1 is ON, and the second secondary switch Sbe is ON.

Figure 14B:
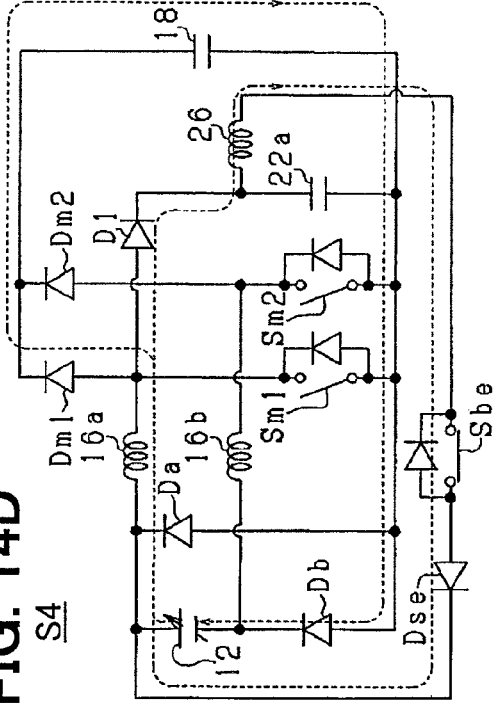

FIG. 14B shows a second state S2 subsequent to the first state S1 shown in FIG. 14A. When the first main switch Sm1 is turned OFF, and the second secondary switch Sbe is OFF, there occurs a transition from the first state S1 to the second state S2. At this time, the voltage between the pair of terminals of the first main switch Sm1 is limited by the speed at which the voltage of the snubber capacitor 22a increases. Therefore, a surge voltage occurring when the first main switch Sm1 is turned OFF can be reduced.

Figure 14C:
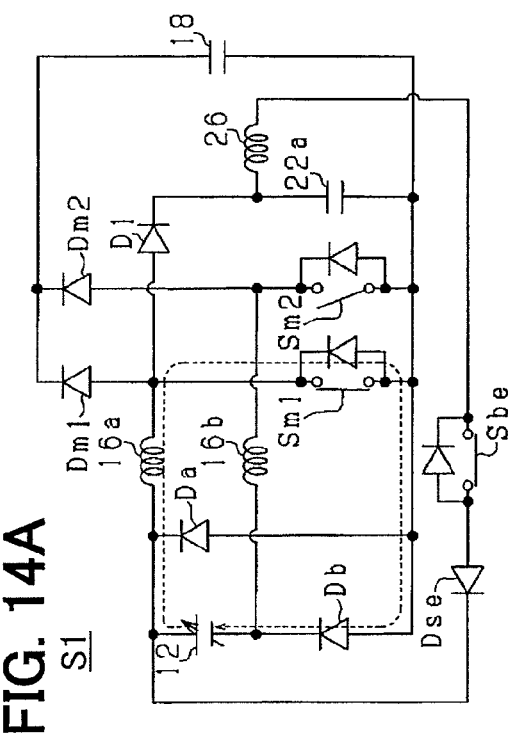

FIG. 14C shows a third state S3 subsequent to the second state S2 shown in FIG. 14B. When the voltage of the snubber capacitor 22a reaches the voltage of the smoothing capacitor 18, there occurs a transition from the second state S2 to the third state S3.

Figure 14D:
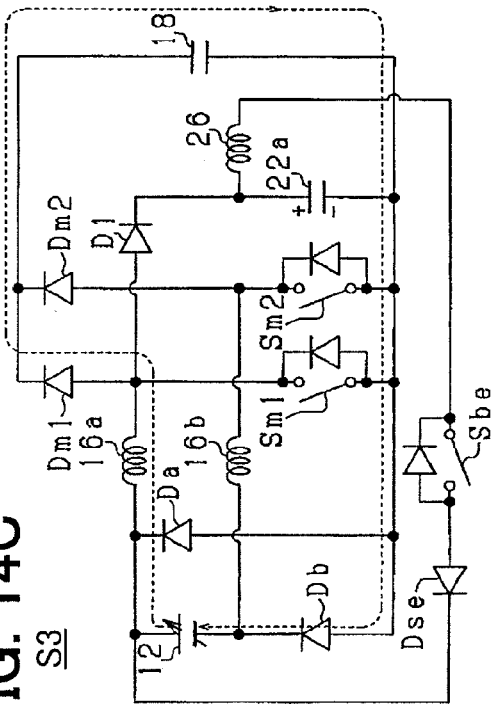

FIG. 14D shows a fourth state S4 subsequent to the third state S3 shown in FIG. 14C. When the second secondary switch Sbe is turned ON, there occurs a transition from the third state S3 to the fourth state S4. Immediately after the second secondary switch Sbe is turned ON, part of the current flowing through the first main inductor 16a flows to the secondary inductor 26 through the first diode D1. Then, the entire current flowing through the first main inductor 16a flows to the secondary inductor 26 through the first diode D1. In this state, the snubber capacitor 22a is discharged. The reason for this is that since the current flows though the second auxiliary diode Db in the forward direction, the second auxiliary diode Db conducts so that a resonant current can flow through a closed loop circuit constructed with the snubber capacitor 22a, the secondary inductor 26, the second secondary switch Sbe, the second secondary diode Dse, the AC power source 12, and the second auxiliary diode Db. Thus, the energy stored in the snubber capacitor 22a is recovered by the AC power source 12 without any loss of energy in theory and used as input energy.

By the way, after that, the first main switch Sm1 is turned ON. At this time, the current to the secondary inductor 26 still continues. Therefore, when the first main switch Sm1 is turned ON, the speed at which the current flowing though the first main switch Sm1 increases is limited. Therefore, a surge voltage occurring when the first main switch Sm1 is turned ON can be reduced. Then, the current flowing through the first main diode Dm1 gradually increases, and the current flowing through the secondary inductor 26 gradually decreases accordingly. Then, when the current flowing through the secondary inductor 26 becomes zero, there occurs a transition to the first state S1 shown in FIG. 14A.

Like the second embodiment, the fifth embodiment described above can reduce the increase in cost of the converter 10.

Sixth Embodiment

A sixth embodiment of the present disclosure is described below.

The sixth embodiment differs from the first embodiment in the configuration of the auxiliary section of the converter 10.

Figure 15:
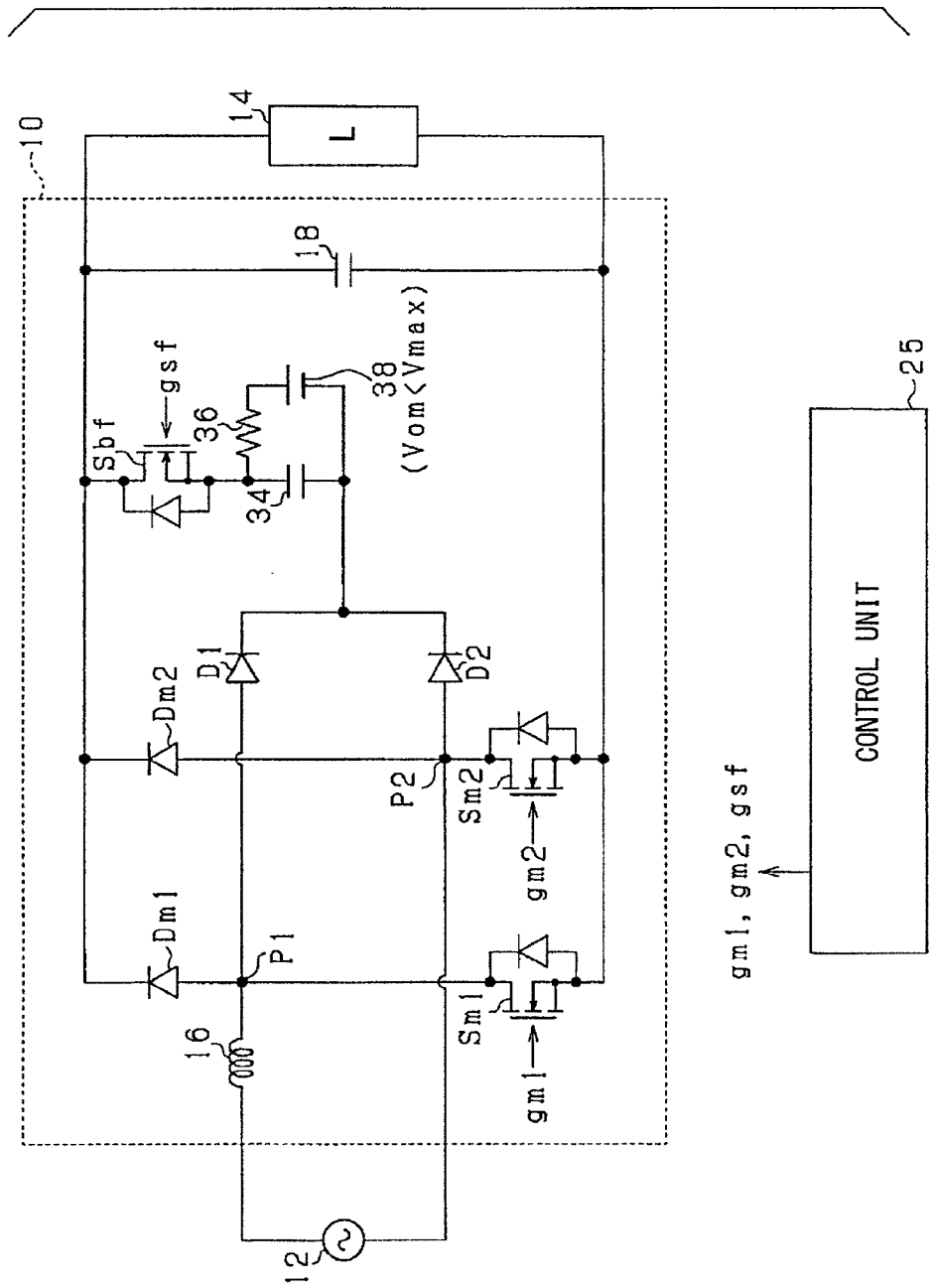
FIG. 15 is a diagram illustrating a system according to a sixth embodiment of the present disclosure.

FIG. 15 shows the converter 10 according to the sixth embodiment. According to the sixth embodiment, the third diode D3 and the fourth diode D4 are not included.

As shown in FIG. 15, the auxiliary section has a snubber circuit (recovery assist circuit) including a capacitor 34, a resistor 36, a power source 38, and a secondary switch Sbf. According to the sixth embodiment, the secondary switch Sbf is an N-channel MOSFET. The cathodes of the first diode D1 and the second diode D2 are connected to the cathode of the second main diode Dm2 through a series circuit of the capacitor 34 and the secondary switch Sbf. Specifically, a source of the secondary switch Sbf is connected to the capacitor 34.

The capacitor 34 is connected in parallel to a series circuit of the resistor 36 and the power source 38. Specifically, a positive terminal of the power source 38 is connected to the resistor 36, and a negative terminal of the power source 38 is connected to the capacitor 34. A terminal voltage Vom of the power source 38 is set smaller than a reverse voltage Vmax (e.g., maximum value of the reverse voltage) which is expected to be applied across the first main diode Dm1 or the second main diode Dm2 when the first main switch Sm1 or the second main switch Sm2 is turned ON. Specifically, for example, the terminal voltage Vom of the power source 38 can be set smaller than a target value of the output voltage of the converter 10.

Next, operations of the auxiliary section according to the sixth embodiment are described with reference to FIGS. 16A-18D. When the output voltage of the AC power source 12 has negative polarity, the auxiliary section operates in the same manner as when the output voltage of the AC power source 12 has positive polarity. Therefore, the description of the operations of the auxiliary section observed when the output voltage of the AC power source 12 has negative polarity is omitted.

FIGS. 16A-16D show a current flow in the converter 10 observed when the output voltage of the AC power source 12 has positive polarity. In this state, a reverse voltage is applied across the second diode D2. Therefore, when the output voltage of the AC power source 12 has positive polarity, the converter 10 has four states as shown in FIGS. 16A-16D.

Figure 16A:
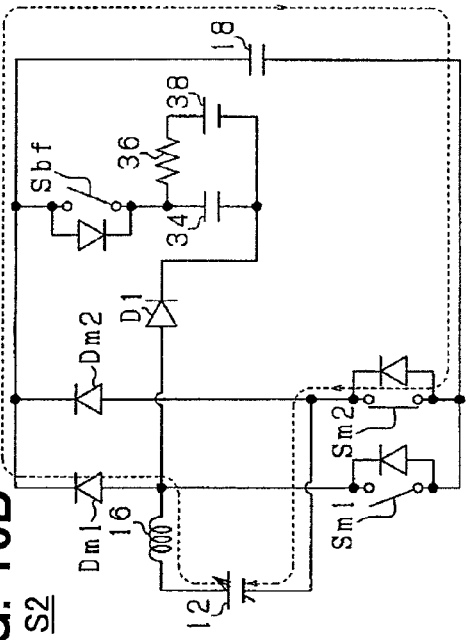
FIGS. 16A, 16B, 16C, and 16D are diagrams illustrating a current flow in a converter according to the sixth embodiment.

FIG. 16A shows a first state S1 where the first main switch Sm1 is ON, and the secondary switch Sbf is OFF.

Figure 16C:
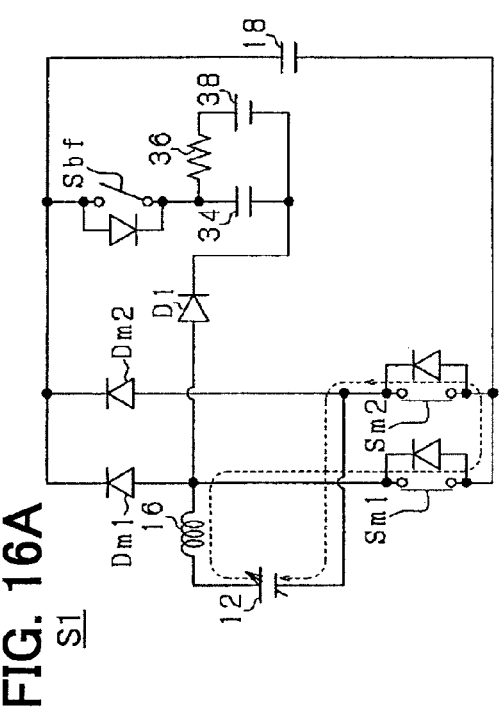
Figure 16B:
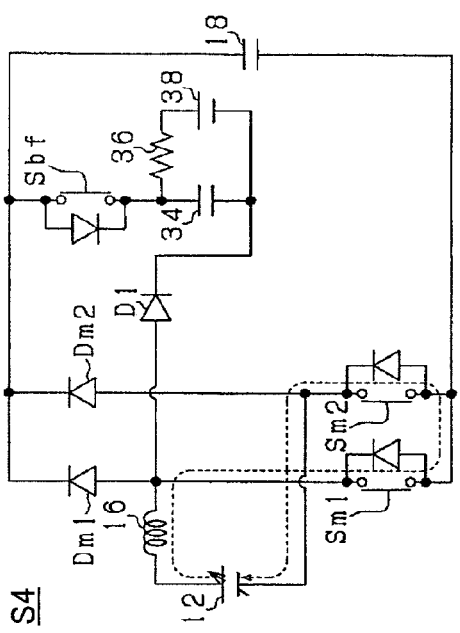

FIG. 16B shows a second state S2 subsequent to the first state S1 shown in FIG. 16A. When the first main switch Sm1 is turned OFF, there occurs a transition from the first state S1 to the second state S2.

FIG. 16C shows a third state S3 subsequent to the second state S2 shown in FIG. 16B. When the secondary switch Sb1 is turned ON before the first main switch Sm1 is turned ON, there occurs a transition from the second state S2 to the third state S3. In the third state S3, a reverse voltage is applied across the first main diode Dm1 by the power source 38, and the current is commutated from the first main diode Dm1 to a current path that passes the secondary switch Sbf. Although the current tries to flow to the power source 38 through the first diode D1 upon turn-ON of the secondary switch Sb1, the current mainly flows to the capacitor 34 due to the presence of the resistor 36. Thus, an increase in a ripple current of the power source 38 can be reduced.

Figure 16D:
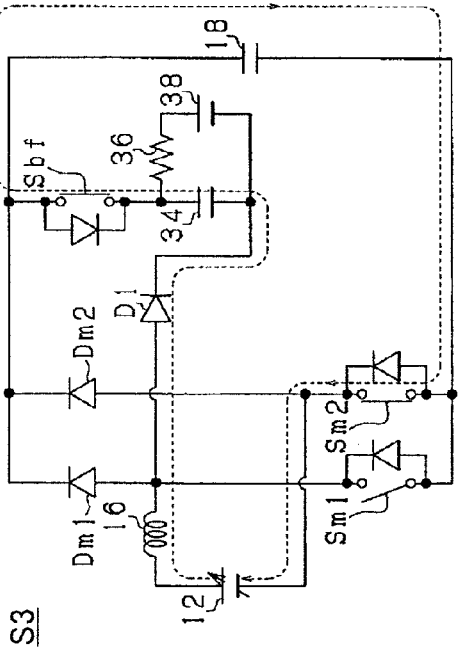

FIG. 16D shows a fourth state S4 subsequent to the third state S3 shown in FIG. 16C. When the first main switch Sm1 is turned ON, there occurs a transition from the third state S3 to the fourth state S4. In the third state S3, the reverse voltage is applied across the first main diode Dm1 by the power source 38. Therefore, when the first main switch Sm1 is turned ON, a recovery current flowing from the main diode Dm1 through the first main switch Sm1 can be reduced.

Like the second embodiment, the sixth embodiment described above can reduce the increase in cost of the converter 10.

Seventh Embodiment

A seventh embodiment of the present disclosure is described below.

The seventh embodiment differs from the third embodiment in the configuration of the main section of the converter 10. Accordingly, the seventh embodiment also differs from the third embodiment in the configuration of the auxiliary section of the converter 10.

Figure 17:
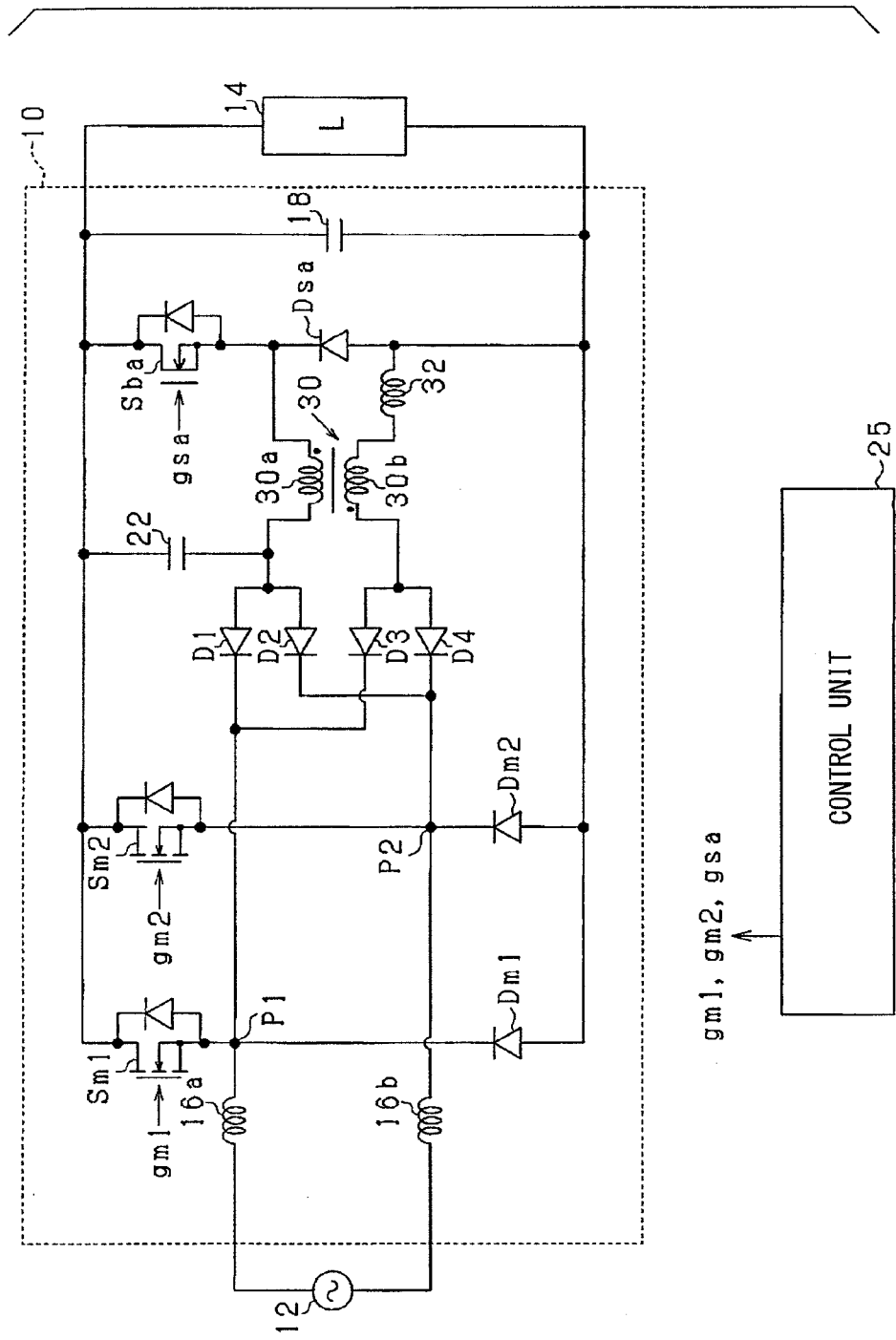
FIG. 17 is a diagram illustrating a system according to a seventh embodiment of the present disclosure.

FIG. 17 shows the converter 10 according to the seventh embodiment.

Firstly, the main section according to the seventh embodiment is described.

As shown in FIG. 17, the cathode of the first main diode Dm1 is connected to the source of the first main switch Sm1, and the cathode of the second main diode Dm2 is connected to the source of the second main switch Sm2. The anodes of the first main diode Dm1 and the second main diode Dm2 are connected together, and the drains of the first main switch Sm1 and the second main switch Sm2 are connected together. The first connection point P1 is connected to the second connection point P2 through the first main inductor 16a, the AC power source 12, and the second main inductor 16b.

It is noted that according to the seventh embodiment, the converter 10 is configured as a bridgeless PFC circuit, not a semi-bridgeless PFC circuit.

Next, the auxiliary section according to the seventh embodiment is described.

The first main switch Sm1 is connected in parallel to a series circuit of the first diode D1 and the snubber capacitor 22, and the second main switch Sm2 is connected in parallel to a series circuit of the second diode D2 and the snubber capacitor 22. Specifically, the anodes of the first diode D1 and the second diode D2 are connected to the snubber capacitor 22.

The anodes of the first diode D1 and the second diode D2 are connected to the source of the secondary switch Sba through the primary coil 30a. The drain of the secondary switch Sba is connected to the drain of the second main switch Sm2. The source of the secondary switch Sba is connected to the cathode of the secondary diode Dsa, and the anode of the secondary diode Dsa is connected to the anode of the second main diode Dm2.

The cathode of the third diode D3 is connected to the first connection point P1, and the cathode of the fourth diode D4 is connected to the second connection point P2. The anodes of the third diode D3 and the fourth diode D4 are connected to the anode of the secondary diode Dsa through the secondary coil 30b and the secondary inductor 32.

Next, operations of the auxiliary section according to the seventh embodiment are described with reference to FIGS. 18A-18D and FIGS. 19A-19D.

When the output voltage of the AC power source 12 has positive polarity, the second main switch Sm2 is controlled (i.e., turned ON and OFF) under a condition that the first main switch Sm1 is kept ON (i.e., kept closed). In this state, since the first main switch Sm1 is always ON, a positive polarity of the voltage of the AC power source 12 is applied to the cathodes of the first diode D1 and the third diode D3 so that a reverse voltage can be applied across both of the first diode D1 and the third diode D3. Therefore, when the output voltage of the AC power source 12 has positive polarity, the converter 10 has eight states as shown in FIGS. 18A-18D and FIGS. 19A-19D. In FIGS. 18A-18D and FIGS. 19A-19D, a state number is assigned to correspond to the state number shown in FIGS. 7A-7D and 8A-8D.

Figure 18A:
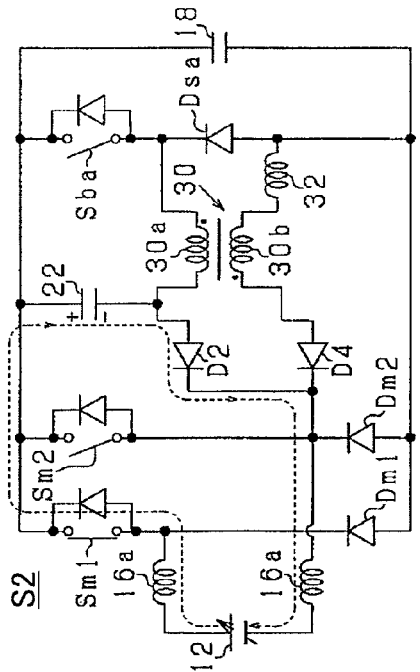
FIGS. 18A, 18B, 18C, and 18D are diagrams illustrating a current flow in a converter according to the seventh embodiment.

FIG. 18A shows a first state S1 where the second main switch Sm1 is ON. In the first state S1, the current flows through a closed loop circuit constructed with the AC power source 12, the first main inductor 16a, the first main switch Sm1, the second main switch Sm2, and the second main inductor 16b.

Figure 18B:
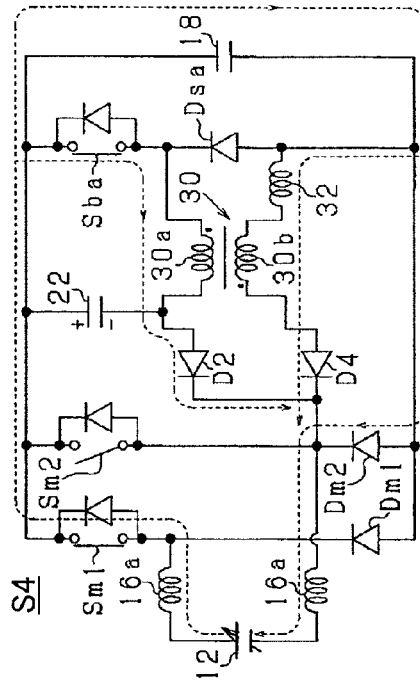

FIG. 18B shows a second state S2 subsequent to the first state S1 shown in FIG. 18A. When the second main switch Sm2 is turned OFF, there occurs a transition from the first state S1 to the second state S2. In the second state S2, the current outputted from the first and second main inductors 16a and 16b flows to the snubber capacitor 22. Therefore, a surge voltage occurring when the second main switch Sm2 is turned OFF can be reduced.

Figure 18C:
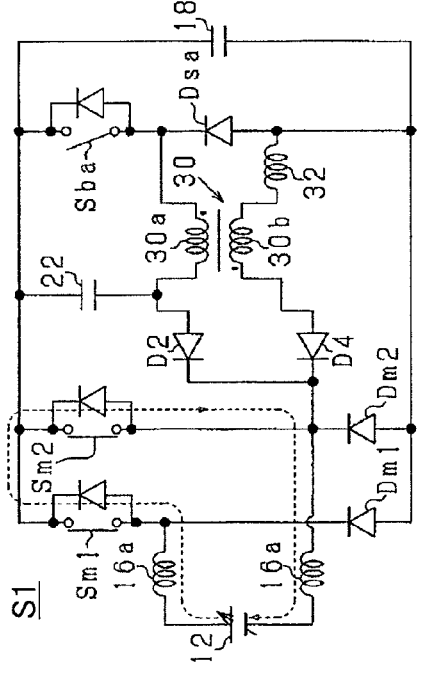

FIG. 18C shows a third state S3 subsequent to the second state S2 shown in FIG. 18B. When the voltage of the snubber capacitor 22 reaches the voltage of the smoothing capacitor 18, there occurs a transition from the second state S2 to the third state S3.

Figure 18D:
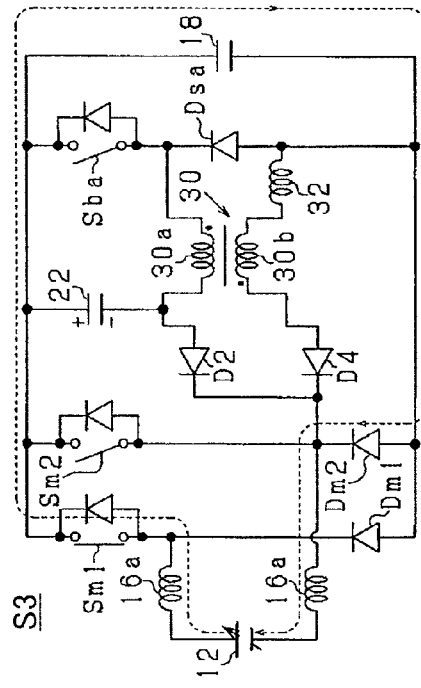

FIG. 18D shows a fourth state S4 subsequent to the third state S3 shown in FIG. 18C. When the secondary switch Sba is turned ON before the second main switch Sm2 is turned ON, there occurs a transition from the third state S3 to the fourth state S4. In the fourth state S4, part of the current outputted from the first and second main inductors 16a and 16b flows to the primary coil 30a through the secondary switch Sba, so that the current can be commutated from the second main diode Dm2 toward the secondary coil 30b. Therefore, after that, while the current flowing through the second main diode Dm2 gradually decreases, the current flowing through the secondary coil 30b gradually increases.

Figure 19B:
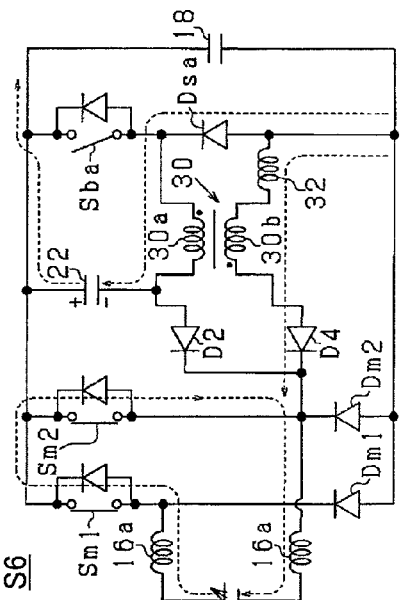
FIGS. 19A, 19B, 19C, and 19D are diagrams illustrating a current flow in a converter according to the seventh embodiment.
Figure 19D:
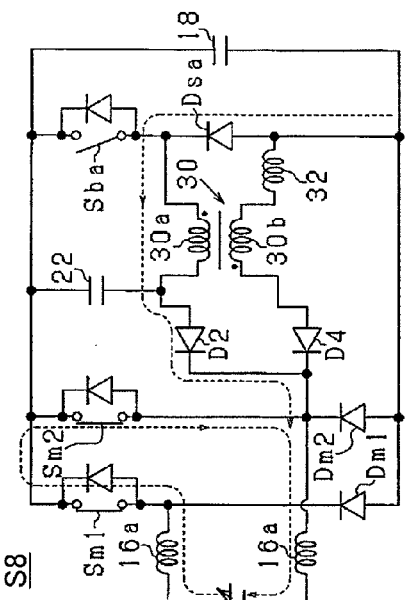
Figure 19A:
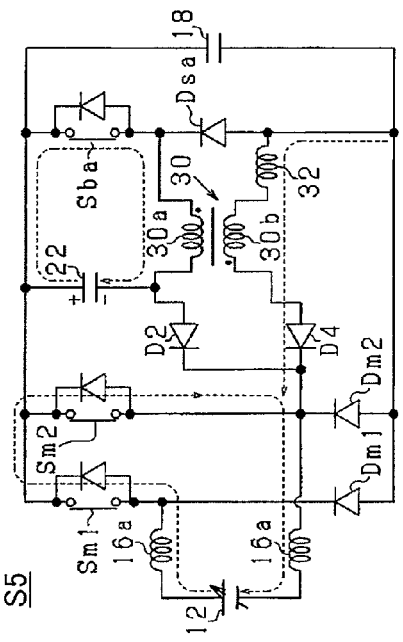

FIG. 19A shows a fifth state S5 subsequent to the fourth state S4 shown in FIG. 18D. When the second main switch Sm2 is turned ON after the current flowing through the second main diode Dm2 becomes zero, there occurs a transition from the fourth state S4 to the fifth state S5. When the second main switch Sm2 is turned ON, the current flowing through the secondary inductor 32 gradually decreases, and the current flowing through the second main switch Sm2 gradually increases accordingly. Since the gradual increase speed is limited by the inductance of the secondary inductor 32, a surge voltage occurring when the second main switch Sm2 is turned ON can be reduced.

Further, when the second main switch Sm2 is turned ON, the potential of the source of the second main switch Sm2 increases. Therefore, the snubber capacitor 22 is discharged so that the current can flow through the secondary switch Sba.

FIG. 19B shows a sixth state S6 subsequent to the fifth state S5 shown in FIG. 19A. When the secondary switch Sba is turned OFF, there occurs a transition from the fifth state S5 to the sixth state S6. In the sixth state S6, since the magnetic energy stored in the transformer 30 is released through the secondary diode Dsa, the snubber capacitor 22 continues to be discharged.

Figure 19C:
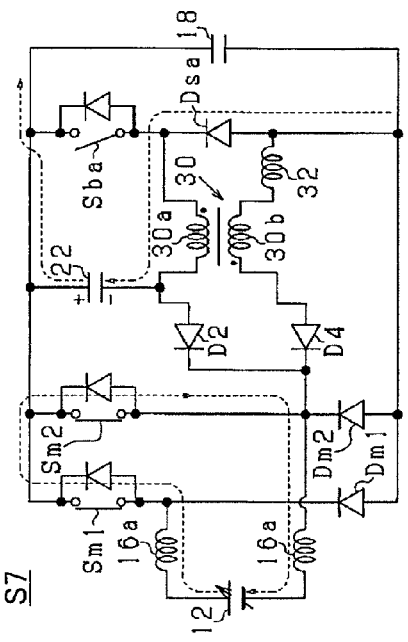

FIG. 19C shows a seventh state S7 subsequent to the sixth state S6 shown in FIG. 19B. When the current flowing through the secondary coil 30b becomes zero, there occurs a transition from the sixth state S6 to the seventh state S7.

FIG. 19D shows an eighth state S8 subsequent to the seventh state S7 shown in FIG. 19C. When the snubber capacitor 22 is fully discharged, there occurs a transition from the seventh state S7 to the eighth state S8. In the eighth state S8, because of the magnetic energy stored in the transformer 30, the current flows through the primary coil 30a. Then, when the magnetic energy stored in the transformer 30 becomes zero, there occurs a transition from the eighth state S8 to the first state S1 shown in FIG. 18A.

Figure 20A:
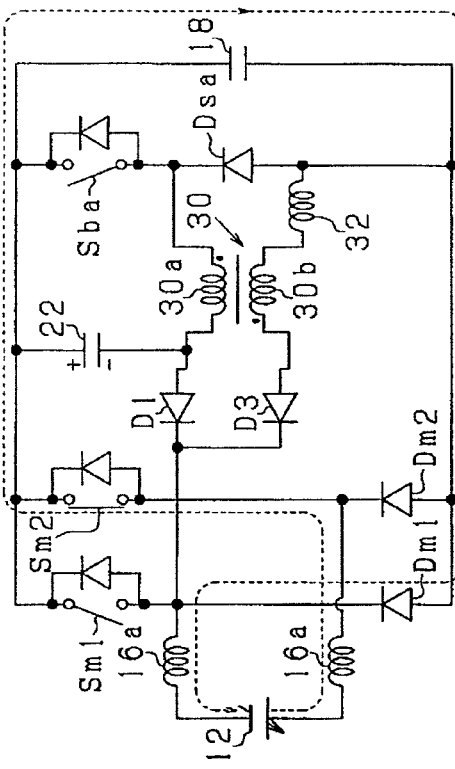
FIGS. 20A and 20B are diagrams illustrating a current flow in a converter according to the seventh embodiment.
Figure 20B:
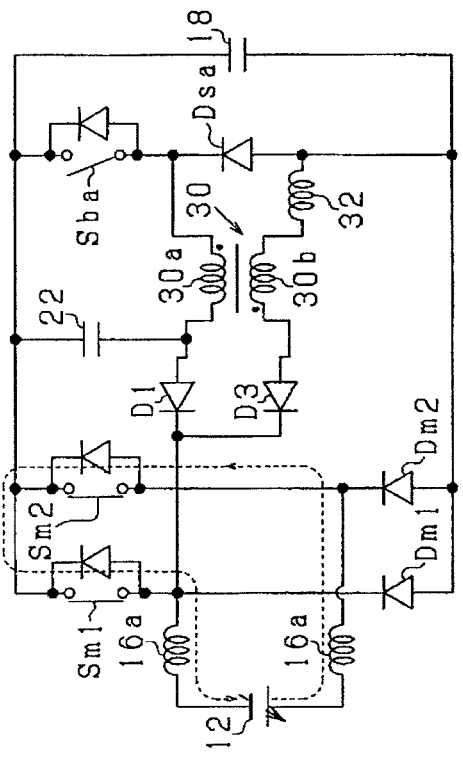

Next, operations of the main section according to the seventh embodiment when the output voltage of the AC power source 12 has negative polarity are described with reference to FIGS. 20A and 20B. When the output voltage of the AC power source 12 has negative polarity, the first main switch Sm1 is controlled (i.e., turned ON and OFF) under a condition that the second main switch Sm2 is kept ON (i.e., kept closed). In this state, since the second main switch Sm2 is always ON, a positive polarity of the voltage of the AC power source 12 is applied to the cathodes of the second diode D2 and the fourth diode D4 so that a reverse voltage can be applied across both of the second diode D2 and the fourth diode D4. Therefore, when the output voltage of the AC power source 12 has negative polarity, the converter 10 has states as shown in FIGS. 20A and 20B. In FIGS. 20A and 20B, a state number is assigned to correspond to the state number shown in FIGS. 18A-18D.

By the way, when the output voltage of the AC power source 12 has negative polarity, the auxiliary section operates in the same manner as described above for when the output voltage of the AC power source 12 has positive polarity. Therefore, the description of the operations of the auxiliary section observed when the output voltage of the AC power source 12 has negative polarity is omitted.

Like the second embodiment, the seventh embodiment described above can reduce the increase in cost of the converter 10.

Eighth Embodiment

An eighth embodiment of the present disclosure is described below.

The eighth embodiment differs from the seventh embodiment in that the configuration of the auxiliary section described in the fourth embodiment is employed.

Figure 21:
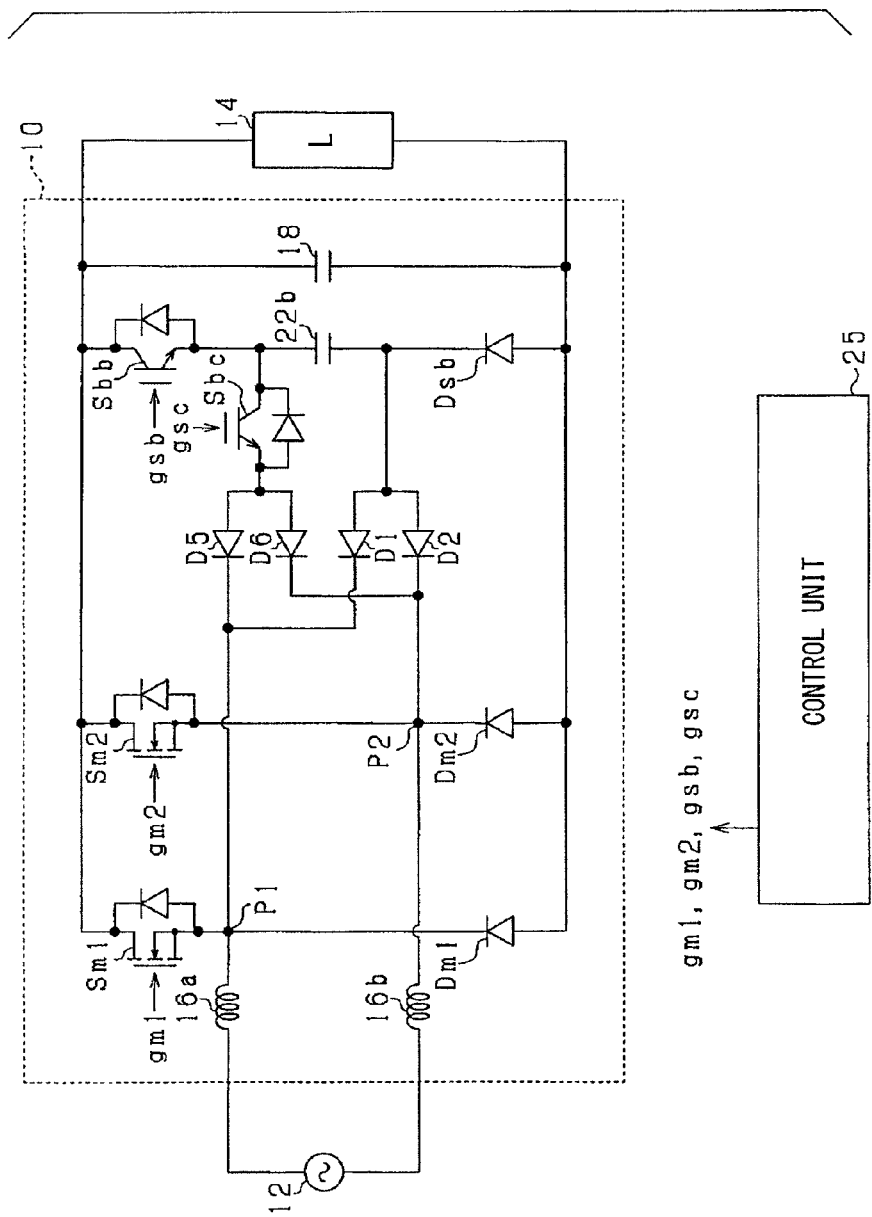
FIG. 21 is a diagram illustrating a system according to an eighth embodiment of the present disclosure.
Figure 22A:
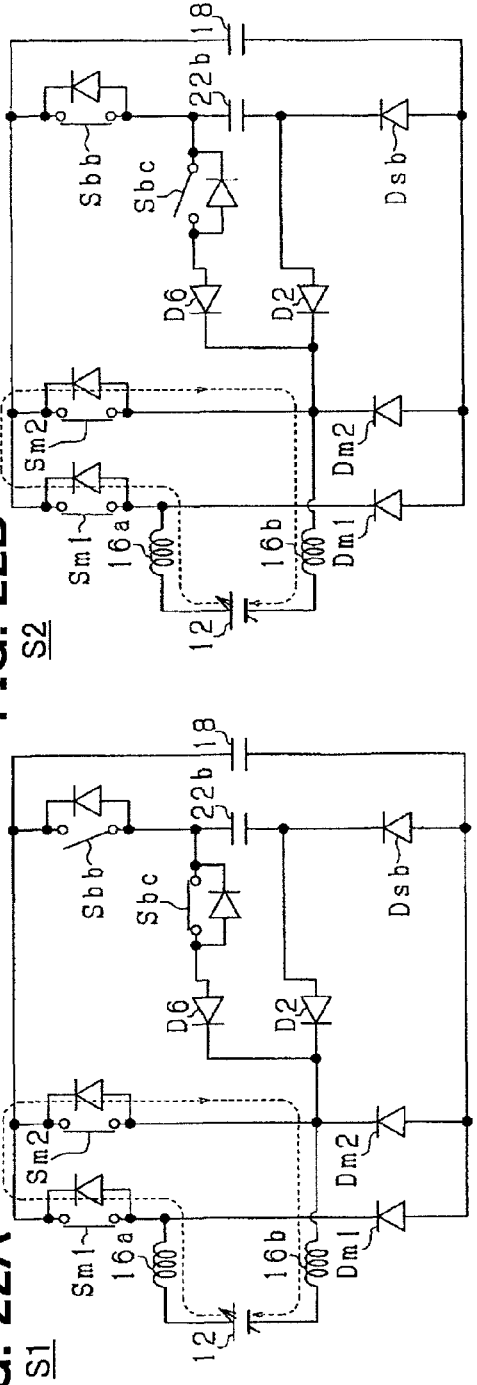
FIGS. 22A, 22B, 22C, and 22D are diagrams illustrating a current flow in a converter according to the eighth embodiment.
Figure 22B:
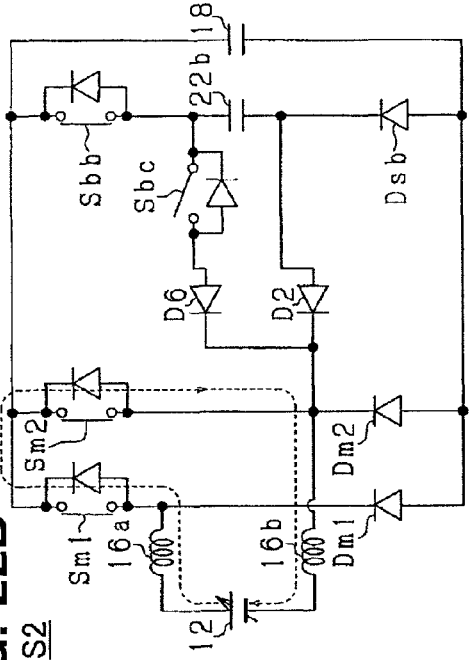
Figure 22C:
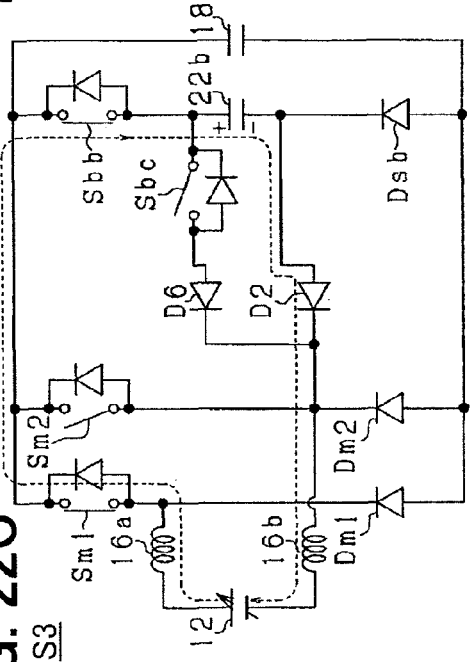
Figure 22D:
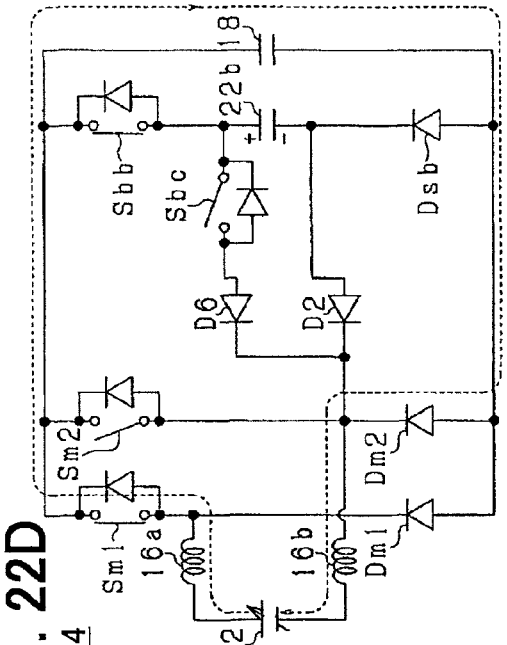
Figure 23A:
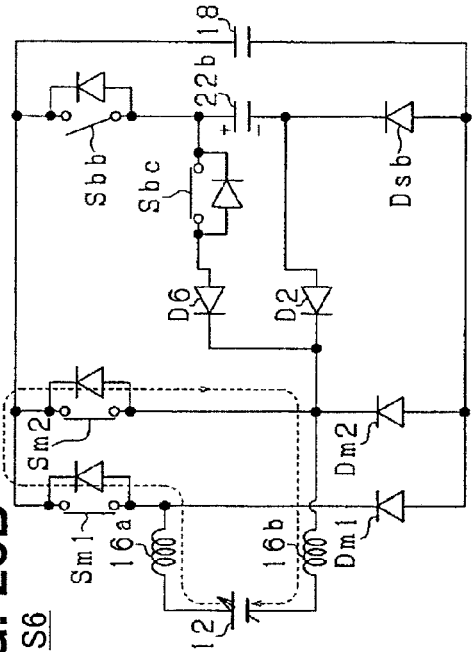
FIGS. 23A, 23B, 23C, and 23D are diagrams illustrating a current flow in a converter according to the eighth embodiment.
Figure 23B:
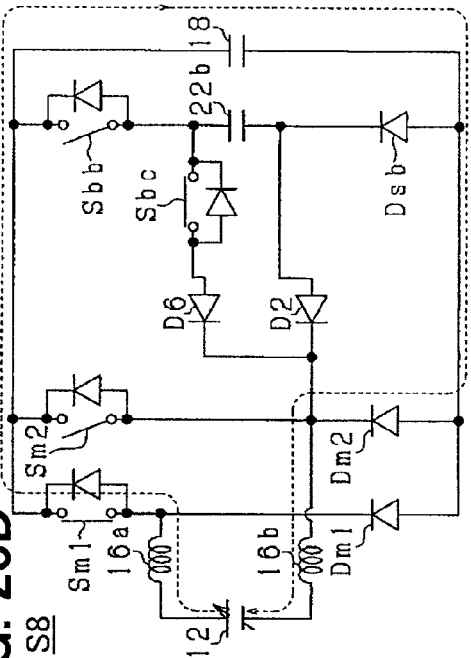
Figure 23C:
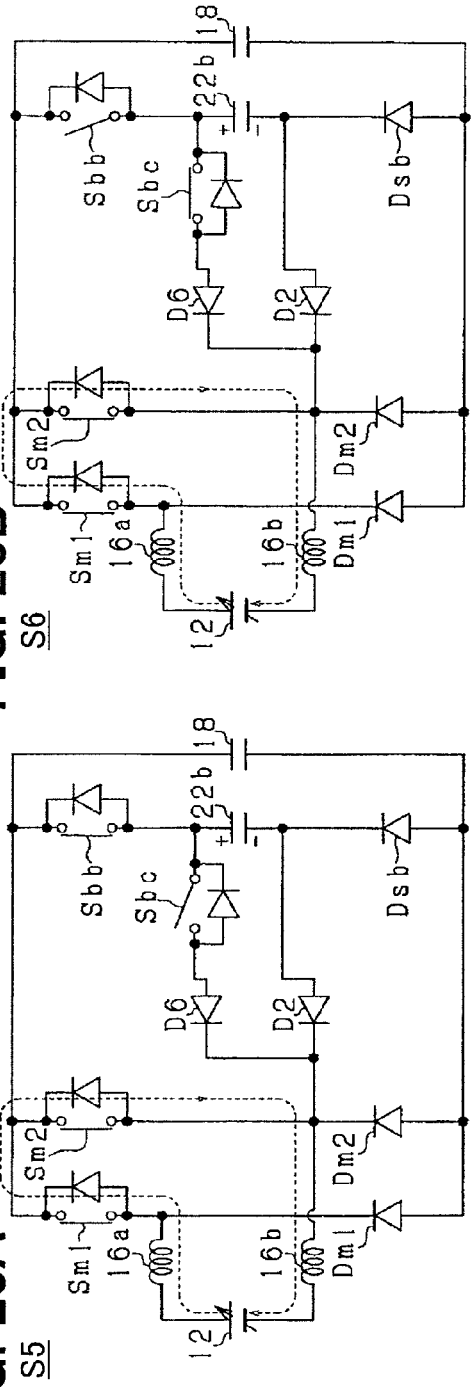
Figure 23D:
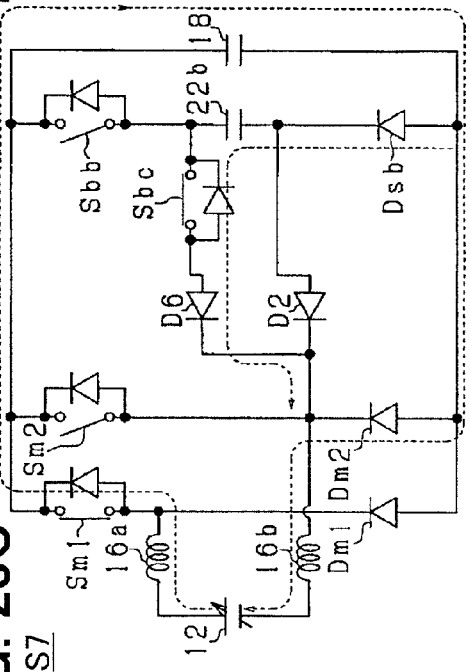

FIG. 21 shows the converter 10 according to the eighth embodiment.

As shown in FIG. 21, the first main switch Sm1 is connected in parallel to a series circuit of the first secondary switch Sbb, the second secondary switch Sbc, and the fifth diode D5. Specifically, the emitter of the first secondary switch Sbb is connected to the collector of the second secondary switch Sbc. Further, the second main switch Sm2 is connected in parallel to a series circuit of the first secondary switch Sbb, the second secondary switch Sbc, and the sixth diode D6.

The anode of the second main diode Dm2 is connected to a connection point between the first secondary switch Sbb and the second secondary switch Sbc through a series circuit of the snubber capacitor 22b and the secondary diode Dsb. Specifically, the snubber capacitor 22b is connected to the cathode of the secondary diode Dsb. Further, the anodes of the first diode D1 and the second diode D2 are connected to a connection point between the snubber capacitor 22b and the secondary diode Dsb.

According to the eighth embodiment, when the output voltage of the AC power source 12 has negative polarity, the auxiliary section operates in the same manner as when the output voltage of the AC power source 12 has positive polarity. Therefore, the description of the operations of the auxiliary section observed when the output voltage of the AC power source 12 has negative polarity is omitted. FIGS. 22A-22D and FIGS. 23A-23D show the operations of the auxiliary section observed when the output voltage of the AC power source 12 has positive polarity. The main section according to the eighth embodiment operates in the same manner as that described in the seventh embodiment. Further, the auxiliary section according to the eighth embodiment operates in the same manner as that described in the fourth embodiment. Therefore, the detailed descriptions of the operations of the main section and the auxiliary section are omitted. Like the second embodiment, the eighth embodiment described above can reduce the increase in cost of the converter 10.

Modifications

The embodiments can be modified in various ways.

The snubber circuit is not limited to those described in the embodiments. For example, in the first embodiment, one of the snubber inductor 20 and the snubber capacitor 22 can be removed. The recovery assist circuit described in the sixth embodiment can be employed in any one of the first, second, third, fourth, fifth, seventh, and the eighth embodiments. That is, the snubber circuit can be constructed with at least one of the snubber inductor, the snubber capacitor, and the recovery assist circuit. When the snubber circuit is constructed with the snubber capacitor, it is not always necessary that the snubber capacitor is located in a current path that bypasses both the primary main switch Sm1 and the secondary main switch Sm2 as shown in FIG. 1 of the first embodiment. For example, the snubber capacitor can be located in a current path that bypasses both the first main diode Dm1 and the second main diode Dm2. For example, the snubber capacitor can be located not only in a current path that bypasses both the primary main switch Sm1 and the secondary main switch Sm2 but also in a current path that bypasses both the first main diode Dm1 and the second main diode Dm2. In this case, common snubber capacitors are shared not only by a series circuit of the first main switch Sm1 and the first main diode Dm1 but also by a series circuit of the second main switch Sm2 and the second main diode Dm2, and the common snubber capacitors are connected in series.

Two or more same or different snubber circuits can be included. Specifically, for example, two or more snubber circuit, each of which is configured as described in the third embodiment, can be included. In this case, to prevent the snubber circuits from operating at the same time, a switch or the like can be used to select one of the snubber circuits to be operated.

A passive lossless snubber circuit with a snubber capacitor is not limited to those described in the second to seventh embodiments. For example, a LC snubber circuit can be used as a passive lossless snubber circuit.

In the first embodiment, a saturable inductor can be used as a snubber inductor.

Figure 24:
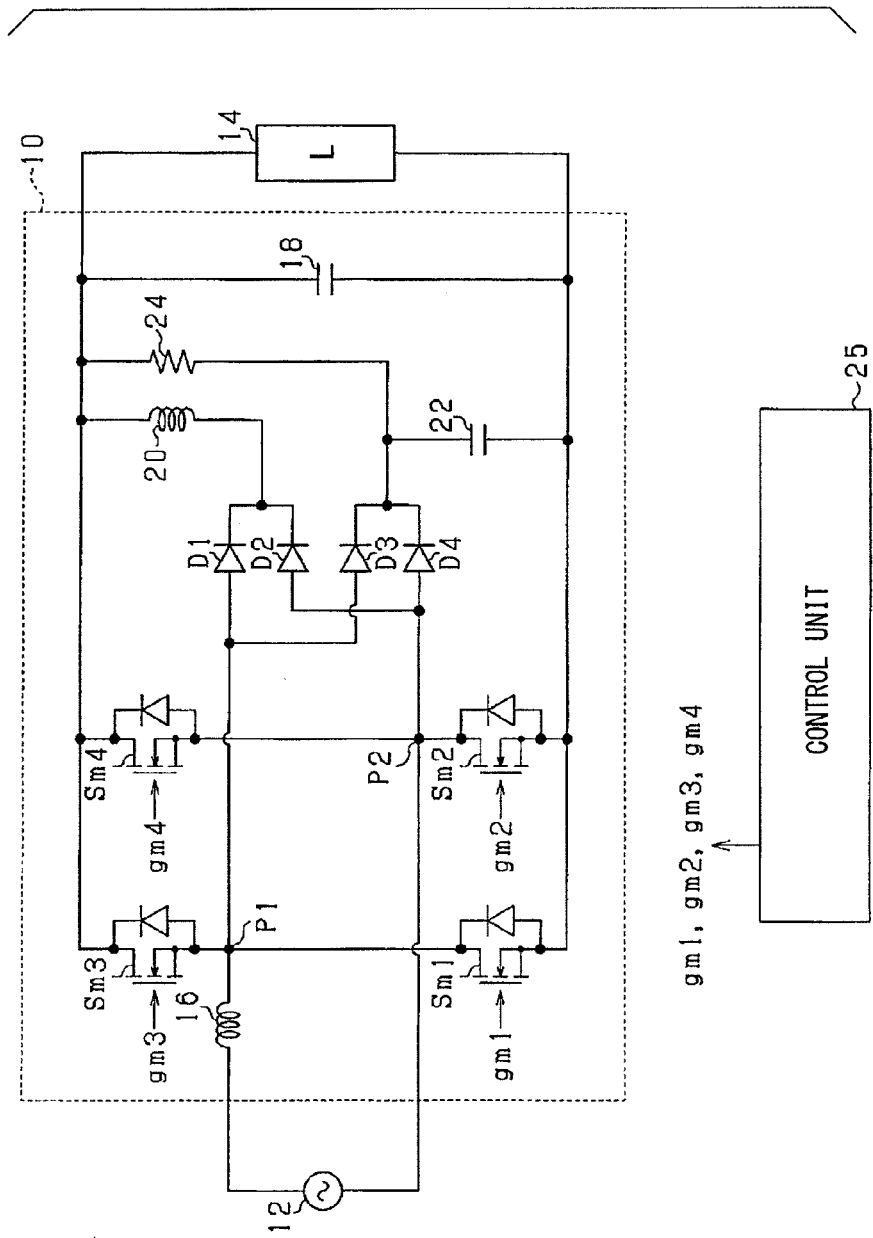
FIG. 24 is a diagram illustrating a system according to a modification of the present disclosure.

A main diode as the second device and the fourth device is not limited to those described in the embodiments. For example, a zener diode or a charge storage diode (CSD) can be used as a main diode. Further, to implement synchronous rectification, a switching device such as a MOSFET can be used instead of a main diode. For example, as shown in FIG. 24, the first main diode Dm1 can be replaced with a third main switch Sm3, and the second main diode Dm2 can be replaced with a fourth main switch Sm4.

The first device and the second device are not limited to those described in the embodiments. For example, an IGBT, a thyristor, or a photomos relay can be used as the first device and the second device.

The fifth device and the sixth device are not limited to a diode. For example, a switching device such as a MOSFET can be used as the fifth device and the sixth device. In this case, the fifth device and the sixth device are controlled (i.e., turned ON and OFF) in accordance with the states of the first main switch Sm1 and the second main switch Sm2.

A reverse voltage applying device is not limited to those described in the embodiments. For example, the capacitor 34 and the resistor 36 can be removed. Even in this case, a reverse voltage can be applied to the first main diode Dm1 and the second main diode Dm2.

In the third and seventh embodiments, the secondary inductor 32 can be an inductor as a passive device.

In the fourth and fifth embodiments, the secondary switch can be a reverse blocking IGBT. Alternatively, the secondary switch can be a field-effect transistor. In this case, a diode connected in antiparallel to a secondary switch can be a parasitic diode of the transistor.

The semi-bridgeless PFC circuit described in the third and fifth embodiments can be used in the first, second, fourth, and sixth to eighth embodiments. Further, the bridgeless PFC circuit described in the first embodiment can be used in the third and fifth embodiments.

What is claimed is:

1. An AC-DC converter comprising:
   a first device capable of switching between an open state to open a current path and a closed state to close the current path;
   a second device connected in series to the first device to form a first series circuit with a first end defined by the first device and a second end defined by the second device;

a third device capable of switching between an open state to open the current path and a closed state to close the current path;

a fourth device connected in series to the third device to form a second series circuit with a first end defined by the third device and a second end defined by the fourth device;

a main inductor interposed between a first connection point between the first device and the second device and a second connection point between the third device and the fourth device;

a common snubber circuit connected between each of the first connection point and the second connection point and at least one of the first end and the second end of the first series circuit;

a fifth device connected between the first connection point and the snubber circuit; and a sixth device connected between the second connection point and the snubber circuit, wherein the first end of the first series circuit is connected to the first end of the second series circuit, the second end of the first series circuit is connected to the second end of the second series circuit, the second device blocks a current from a high potential side to a low potential side of the second device when the first device is in the closed state and allows the current from the low potential side to the high potential side of the second device when the first device is in the open state, the fourth device blocks the current from a high potential side to a low potential side of the fourth device when the third device is in the closed state and allows the current from the low potential side to the high potential side of the fourth device when the third device is in the open state, when the first device switches from the closed state to the open state to block the current through the first device, the current flows between the main inductor and the first connection point in a first direction, the fifth device blocks the current between the main inductor and the first connection point in a second direction opposite to the first direction from flowing through the fifth device, when the third device switches from the closed state to the open state to block the current through the third device, the current flows between the main inductor and the second connection point in a third direction, and the sixth device blocks the current between the main inductor and the second connection point in a fourth direction opposite to the third direction from flowing through the sixth device.

2. The AC-DC converter according to claim 1, wherein the snubber circuit includes at least one of a snubber capacitor, a snubber inductor, and a reverse voltage applying device, the snubber capacitor is provided to at least one of a first path and a second path, the first path bypassing both the first device and the third device, the second path bypassing both the second device and the fourth device, the snubber inductor is connected in parallel to both of the second device and the fourth device, the reverse voltage applying device is connected in parallel to both of the second device and the fourth device to apply a first reverse voltage to the second device or the fourth device, the first reverse voltage is smaller than each of a second reverse voltage and a third reverse voltage, the second reverse voltage is expected to be applied to the second device when the first device switches from the open state to the closed state, and the third reverse voltage is expected to be applied to the fourth device when the third device switches from the open state to the closed state.

3. The AC-DC converter according to claim 2, wherein the snubber circuit is configured as a lossless snubber circuit including the snubber capacitor.

4. The AC-DC converter according to claim 3, wherein the snubber circuit includes an energy storing inductor and a secondary switch, and the secondary switch transfers energy stored in the snubber capacitor to the energy storing inductor to allow the energy to be used as input or output energy of the AC-DC converter.

5. The AC-DC converter according to claim 4, wherein the snubber circuit includes a transformer and a secondary block device, a primary coil of the transformer provides the energy storing inductor, a secondary coil of the transformer provides the snubber inductor, the fifth device is connected to a first end of the snubber capacitor and a first end of the primary coil, and a first end of the secondary coil is connected to the fifth device directly or indirectly, the primary coil and the secondary switch are connected between the first end of the snubber capacitor and the first end of the first series circuit, and the secondary block device is connected between a second end of the primary coil and a second end of the secondary coil to allow the current from a low potential side to a high potential side of the secondary block device and to block the current from the high potential side to the low potential side of the secondary block device.

6. The AC-DC converter according to claim 5, further comprising:

a first controller capable of keeping one of the first device and the third device in the open state or the closed state while causing the other of the first device and the third device to periodically switch between the open state and the closed state, and a second controller capable of closing the secondary switch when the other of the first device and the third device is in the open state.

7. The AC-DC converter according to claim 3, wherein the snubber capacitor is provided to the first path bypassing both the first device and the third device, the snubber circuit includes a first secondary switch, a second secondary switch, a first secondary block device, a second secondary block device, and a third secondary block device, the fifth device is connected to a first end of the snubber capacitor, the first secondary block device is connected between the first end of the snubber capacitor and the second end of the first series circuit to allow the current from a low potential side to a high potential side of the first secondary block device and to block the current from the high potential side to the low potential side of the first secondary block device, the first secondary switch is provided to a third path between the second end of the snubber capacitor and the first end of the first series circuit and capable of switching between an open state to open the third path and a closed state to close the third path, the second secondary block device is connected between the first connection point and a connection point between the snubber capacitor and the first secondary switch to block the current between the main inductor and the first connection point in the second direction from flowing the second secondary block device, the third secondary block device is connected between the second connection point and the connection point between the snubber capacitor and the first secondary switch to block the current between the main inductor and the second connection point in the fourth direction from flowing the third secondary block device, and the second secondary switch is provided to a fourth path between a connection point between the snubber capacitor and the first secondary switch and each of the second secondary block device and the third secondary block device, the second secondary switch being capable of switching between an open state to open the fourth path and a closed state to close the fourth path.

8. The AC-DC converter according to claim 7, further comprising:
   a first controller capable of keeping one of the first device and the third device in the open state or the closed state while causing the other of the first device and the third device to periodically switch between the open state and the closed state, and
   a second controller capable of controlling the first secondary switch and the second secondary switch, wherein
   in each operation cycle of the first controller, the first controller causes the other of the first device and the third device to switch to the open state and then causes the other of the first device and the third device to switch to the closed state once,
   within a first operation cycle of the first controller, the second controller causes the first secondary switch to switch to the closed state and causes the second secondary switch to switch to the open state before the first controller causes the other of the first device and the third device to switch to the open state, and
   within a second operation cycle of the first controller subsequent to the first operation cycle, the second controller causes the first secondary switch to switch to the open state and causes the second secondary switch to switch to the closed state before the first controller causes the other of the first device and the third device to switch to the open state.

9. The AC-DC converter according to claim 2, wherein
   the snubber circuit includes the reverse voltage applying device,
   the reverse voltage applying device includes a power source and a switching device,
   the power source is connected in parallel to each of the second device and the fourth device and has a negative terminal connected to the sixth device,
   the switching device switches between an open state not to apply the first reverse voltage and a closed state to apply the first reverse voltage, and
   a terminal voltage of the power source is smaller than each of the second reverse voltage and the third reverse voltage.

10. The AC-DC converter according to claim 3, wherein
    the snubber circuit includes the reverse voltage applying device,
    the reverse voltage applying device includes a power source and a switching device,
    the power source is connected in parallel to each of the second device and the fourth device and has a negative terminal connected to the sixth device,
    the switching device switches between an open state not to apply the first reverse voltage and a closed state to apply the first reverse voltage, and
    a terminal voltage of the power source is smaller than each of the second reverse voltage and the third reverse voltage.

11. The AC-DC converter according to claim 4, wherein
    the snubber circuit includes the reverse voltage applying device,
    the reverse voltage applying device includes a power source and a switching device,
    the power source is connected in parallel to each of the second device and the fourth device and has a negative terminal connected to the sixth device,
    the switching device switches between an open state not to apply the first reverse voltage and a closed state to apply the first reverse voltage, and
    a terminal voltage of the power source is smaller than each of the second reverse voltage and the third reverse voltage.

12. The AC-DC converter according to claim 5, wherein
    the snubber circuit includes the reverse voltage applying device,
    the reverse voltage applying device includes a power source and a switching device,
    the power source is connected in parallel to each of the second device and the fourth device and has a negative terminal connected to the sixth device,
    the switching device switches between an open state not to apply the reverse voltage and a closed state to apply the first reverse voltage, and
    a terminal voltage of the power source is smaller than each of the second reverse voltage and the third reverse voltage.

13. The AC-DC converter according to claim 6, wherein
    the snubber circuit includes the reverse voltage applying device,
    the reverse voltage applying device includes a power source and a switching device,
    the power source is connected in parallel to each of the second device and the fourth device and has a negative terminal connected to the sixth device,
    the switching device switches between an open state not to apply the first reverse voltage and a closed state to apply the first reverse voltage, and
    a terminal voltage of the power source is smaller than each of the second reverse voltage and the third reverse voltage.

14. The AC-DC converter according to claim 7, wherein
    the snubber circuit includes the reverse voltage applying device,
    the reverse voltage applying device includes a power source and a switching device,
    the power source is connected in parallel to each of the second device and the fourth device and has a negative terminal connected to the sixth device,
    the switching device switches between an open state not to apply the first reverse voltage and a closed state to apply the first reverse voltage, and
    a terminal voltage of the power source is smaller than each of the second reverse voltage and the third reverse voltage.

15. The AC-DC converter according to claim 8, wherein
the snubber circuit includes the reverse voltage applying device,
the reverse voltage applying device includes a power source and a switching device,
the power source is connected in parallel to each of the second device and the fourth device and has a negative terminal connected to the sixth device,
the switching device switches between an open state not to apply the first reverse voltage and a closed state to apply the first reverse voltage, and
a terminal voltage of the power source is smaller than each of the second reverse voltage and the third reverse voltage.

\* \* \* \* \*